May 8, 1962     A. M. WRIGHT     3,032,986
FUEL AND SPEED CONTROL SYSTEM FOR TURBOJET ENGINE
Filed Nov. 28, 1952     3 Sheets-Sheet 1

INVENTOR
A. M. WRIGHT
BY
ATTORNEY

May 8, 1962 A. M. WRIGHT 3,032,986
FUEL AND SPEED CONTROL SYSTEM FOR TURBOJET ENGINE
Filed Nov. 28, 1952 3 Sheets-Sheet 2

INVENTOR
A.M. WRIGHT
BY
ATTORNEY

May 8, 1962 A. M. WRIGHT 3,032,986
FUEL AND SPEED CONTROL SYSTEM FOR TURBOJET ENGINE
Filed Nov. 28, 1952 3 Sheets-Sheet 3

INVENTOR
A. M. WRIGHT
BY (signature)
ATTORNEY

United States Patent Office 3,032,986
Patented May 8, 1962

3,032,986
FUEL AND SPEED CONTROL SYSTEM FOR TURBOJET ENGINE
Alexander M. Wright, Hartford, Conn., assignor, by mesne assignments, to Chandler-Evans Corporation, West Hartford, Conn., a corporation of Delaware
Filed Nov. 28, 1952, Ser. No. 322,869
30 Claims. (Cl. 60—39.28)

This invention pertains to automatic fuel and speed control apparatus for internal combustion engines and more particularly has reference to fuel and speed controls for aircraft continuous combustion engines of the gas turbine and jet types.

The invention is especially applicable to continuous combustion engines for jet-propulsion (turbo-jet), or propeller-and-jet (prop-jet) propulsion of aircraft. Such engines usually include an air inlet, an air compressor, one or more combustion chambers, a gas turbine, and a tail pipe for discharging combustion gases to the atmosphere. Associated with these engines is a fuel system including a pump for delivering fuel to the combustion chambers. This invention concerns apparatus to control the engine speed and power by regulating the fuel supply as a function of a manual control and several variables, including engine inlet air temperature and pressure, engine speed, engine temperature, and other engine operating conditions.

Owing to structural and metallurgical limitations, engines of the type referred to cannot be safely operated at speeds and temperatures exceeding predetermined limiting values, but for maximum economy of operation, both engine speed and temperature must be maintained at or near these limiting values. On the other hand, while engine speed is a critical factor in flight performance of aircraft, an engine cannot be operated at maximum speed in all flight maneuvers, at all flight altitudes or under all flight conditions. Fuel and speed control apparatus should, therefore, enable the operator to vary engine speed and power as desired from a required minimum to the predetermined limit of speed and full power.

The value of engine speed corresponding to any given value of fuel flow, varies as a function of the speed of flight, pressure and temperature of the engine inlet air, engine air compressor characteristics and a wide variety of other factors. Also, the maximum fuel flow to a turbojet engine is limited by the maximum permissible compression ratio of the air compressor that results from that fuel flow, under any combination of engine speed, engine inlet air temperature and pressure, and rate of air flow through the engine, that may obtain under varying flight operating conditions. Therefore, for proper regulation of engine operation, and to avoid compressor stall, burner blowout and other causes of engine failure, it is not feasible to rely upon automatic regulation of fuel flow as a function of variables which do not include the factors mentioned.

Another important requirement of a satisfactory fuel and speed control is ability to accelerate the engine at a maximum rate without causing compressor stall, and to decelerate the engine at a maximum rate without causing burner blowout.

Still another important requirement of a satisfactory fuel and speed control apparatus is the provision of an emergency fuel supply and control system which is integrated with the main fuel system and which comes into operation, in the event of a failure of the normal fuel supply and control system.

In turbo-jet engine fuel control systems heretofore in use, engine performance is controlled by regulating the fuel supply to the engine by a control apparatus which varies the delivery of a fuel pump by applying correction factors which modify said delivery, in order to compensate the fuel flow to the engine for variations in pressure and temperature of the air entering the engine caused by variations in flight altitude and other flight operating conditions. However, I have found that better control of engine operation can be obtained by providing a fuel control system in which inlet air pressure and temperature compensation of the fuel flow to the engine is inherent in the system, and hence such correction factors are not required to compensate for changing operating conditions.

The objects of this invention are to provide an improved fuel and speed control apparatus for turbojet engines embodying the following features:

(1) A control apparatus comprising, in a single self-contained package, a normal fuel supply and control system, and an emergency fuel supply and control system which comes into operation in the event of failure of the normal system; each system comprising a series of component coordinated hydraulic devices for regulating fuel delivery to the engine; said devices being collectively responsive to a single manual control, to inlet air pressure and temperature, and to speed of the engine.

(2) A control apparatus which comprises a series of devices that measure inlet air absolute temperature and pressure, and engine speed (r.p.m.) and position a main fuel metering valve in accordance with said pressure multiplied by a selected function of the ratio of said speed to the square root of said temperature; while the pressure differential (metering head) across said valve is regulated as a linear function of said temperature.

(3) A fully automatic, hydraulic control apparatus in which the fuel flow to the engine is compensated for variations in absolute inlet air pressure and temperature, and engine speed, and said compensation is inherent in the operation of the apparatus, so that additional correction factors for these variables are not required in order to compensate for variations in operating conditions due to said variables.

(4) A fully automatic, hydraulic control apparatus which uses as control "parameters," for limiting the maximum fuel flow to the engine, the quantities "corrected speed" and "corrected fuel flow," as defined hereinbelow.

(5) A control apparatus which produces a substantially constant engine speed, corresponding to any selected position of a single manual control lever, under all engine operating conditions.

(6) A control apparatus which functions so that the engine can be accelerated at a maximum rate, corresponding to the pressure and temperature of the air entering the engine compressor, without causing compressor stall and decelerated at a maximum rate without causing burner blowout.

(7) A control apparatus wherein the fuel flow to the engine is varied by:

(A) a metering orifice whose area is varied in accordance with the product of inlet air pressure times a selected function of the ratio of engine speed to the square root of the inlet air temperature.

(B) a metering head across said orifice which:
  (a) during engine acceleration, varies in accordance with the temperature;
  (b) during steady state engine operation, is controlled as a direct function of engine speed by a centrifugal speed governor geared to the engine, whose action is responsive to the position of a manual control lever; and
  (c) during engine deceleration, is controlled as a function of the ratio of engine speed to the square root of inlet air temperature.

(8) A control apparatus wherein the fuel regulating mechanism operates in its own fluid (which may be either an oil or engine fuel), and acts directly on the fuel supplied by a constant delivery pump and regulates its flow to the engine by means of a plurality of suitably controlled by-pass valves.

(9) A fuel and speed control apparatus having control devices which vary the fuel flow in accordance with variations in temperature and pressure of the ambient atmosphere, to prevent engine failure at high altitudes and low atmospheric temperatures.

(10) A control apparatus having override speed and temperature control devices which prevent the engine from operating at excessive speeds and temperatures.

With these and other objects in view which may be incident to my improvements, my invention consists in the combination and arrangement of elements hereinafter described and illustrated in the accompanying drawings, in which.

Figure 1:
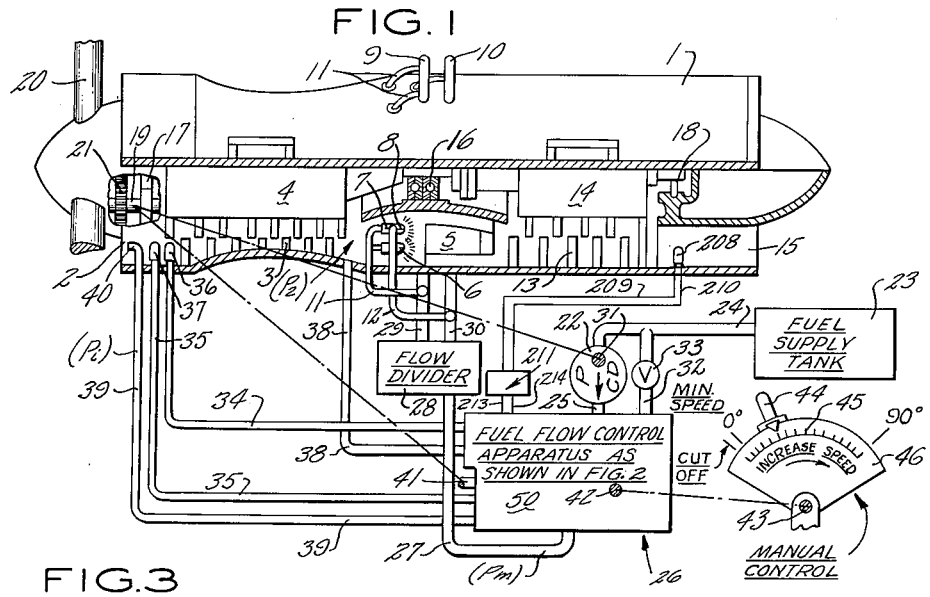
FIGURE 1 shows, somewhat diagrammatically, an engine suitable for propeller-and-jet propulsion of aircraft, with its associated fuel control apparatus, operating in conjunction with a constant displacement fuel pump and a manual control lever, and the principal connections therebetween.

The fuel and speed control apparatus herein disclosed comprises, in a single unit, a normal and an emergency fuel supply and control system, connected in parallel between a fuel pump and the combustion nozzles of the engine, and so arranged that fuel is normally supplied to the engine only through the normal system, but in the event of failure of the normal system, the emergency system comes into operation and continues to supply fuel to the engine until the normal system is restored to operation.

The normal control system is a fully automatic, hydraulic system, comprising a series of coordinately controlled devices which coact to produce such a regulated fuel flow to the engine as is required to obtain selected, desirable operating characteristics of the engine, under a wide variety of operating conditions. The normal control system regulates the fuel flow to the engine by using as control "parameters" the quantities "corrected speed" and "corrected fuel flow," which are respectively defined as:

actual engine revolutions per minute (N), divided by the square root of the engine inlet air absolute temperature ($T_1$), i.e., $N/\sqrt{T_1}$; and the fuel flow to the engine ($W_f$), divided by the engine inlet air absolute, total unit pressure ($P_1$), times the square root of the temperature $T_1$, i.e. $W_f/(P_1 \cdot \sqrt{T_1})$.

By using these quantities (corrected speed and corrected fuel flow), the altitude and atmospheric temperature compensation of fuel flow to the engine is inherent in the system, and correction factors are not required to compensate for variations in operating conditions which are due to such factors, as in turbo-jet engine fuel control systems heretofore employed.

The basic philosophy of the normal fuel control system, according to my invention, is shown in the following overall analysis.

The maximum fuel flow to a turbo-jet engine is limited by the permissible compressor ratio that results from that rate of fuel flow $W_f$, at any engine speed N, inlet air absolute temperature $T_1$, and inlet air absolute total unit pressure $P_1$. Since an aircraft turbo-jet engine must operate over a wide range of speeds and altitudes, the quantities N, $P_1$ and $T_1$ are also variable over a very wide range. If, at any conditions of N, $P_1$, and $T_1$ the fuel flow $W_f$ exceeds a certain magnitude, compressor stall results, and the engine becomes inoperative. As will be shown hereinafter, for a particular engine design, the relation between the maximum permissible fuel flow ($W_f$), engine speed (N), inlet air absolute temperature ($T_1$) and total unit pressure ($P_1$), can be expressed by the equation:

$$W_f/(P_1\sqrt{T_1}) = f(N/\sqrt{T_1}) \qquad (1)$$

The functional relation "$f$" in Equation 1 is determined by the design of any particular engine model.

The functional relation "$f$" in Equation 1 may be expanded to as many terms as desired by well known mathematical methods, so that Equation 1 may be expressed as follows:

$$W_f/(P_1\sqrt{T_1}) = a_0 + a_1(N/\sqrt{T_1}) + a_2(N/\sqrt{T_1})^2 + a_3(N/\sqrt{T_1})^3 + \ldots \qquad (2)$$

Then the fuel flow, $W_f$, in terms of N, P, and T, is $$W_f = P_1(a_0\sqrt{T_1} + a_1 N a_2 N^2/\sqrt{T_1} + a_3 N^3/\sqrt{T_1} + \ldots) \qquad (3)$$

This is a rather complex expression, and prior art controllers that meter fuel flow as some function of engine speed (N), with added compensation for inlet air temperature ($T_1$) and pressure ($P_1$) effects are, in general, unable to do more than approximate to the required function. The constants, $a_0$, $a_1$, etc., are dependent on engine design, and only by fortuitous circumstances can controllers of the type mentioned give good results for all values of inlet air temperature and pressure. The result is that optimum engine performance is not obtained in some regions of its operating area.

My improved fuel and speed control apparatus avoids this difficulty by generating the function "$f$" in Equation 1 directly. Another basic advance in the art of controlling turbojet engines achieved by my improved apparatus is the embodiment therein of means for measuring the quantity, $N/\sqrt{T_1}$, and means for metering fuel to the engine so that, for each value of $N/\sqrt{T_1}$ a preselected maximum value of the quantity, $W_f/(P_1 \cdot \sqrt{T_1})$ is obtained. Thus, my apparatus contains inherent inlet air pressure and temperature compensation.

In my normal fuel supply system, the fuel flow to the engine is regulated so that the corrected fuel flow, $W_f/(P_1 \cdot \sqrt{T_1})$, is limited to a safe maximum for each value of $N/\sqrt{T_1}$. To achieve this result, the normal system comprises a metering head regulator, a metering head detector and by-pass valve, and a main metering valve, all of which are described in detail later.

The metering head regulator sets up a hydraulic pressure differential ($h_m - h_o$), which is maintained proportional to the engine air inlet temperature $T_1$. The pressure differential ($h_m - h_o$) is compared with the pressure differential ($p_f - p_m$) across the main metering valve, and the difference between these quantities is applied to position a by-pass valve which regulates the pressure, $p_f$, upstream of a main fuel metering valve, in relation to the metered fuel pressure, $p_m$, downstream of said metering valve, so that:

$$p_f - p_m = h_m - h_o \qquad (4)$$

The pressure drop ($p_f - p_m$) is established by the fuel flow through the main metering valve, so that:

$$(p_f - p_m) = (W_f/CA_v)^2 \qquad (5)$$

(where, C is the flow coefficient and $A_v$ is the flow area through said valve), and since $(p_f - p_m) = (h_m - h_o)$, and $(h_m - h_o)$ is a linear function of $T_1$, it follows that the pressure drop across the main fuel metering valve is also a linear function of $T_1$.

The flow area, $A_v$ through the main fuel metering valve is varied by positioning said valve by the conjoint action of: (1) a "corrected speed computer," which automatically computes the ratio $(N/\sqrt{T_1})$ and has an output movement that is a selected function of $(N/\sqrt{T_1})$; and (2) an inlet air pressure, $P_1$, multiplier, which multiplies said movement by the measured value of $P_1$. The main fuel metering valve has a specially contoured seat such that the area, $A_v$, of the fuel flow path therethrough is a selected function of the lift imparted to the valve by the conjoint action of the corrected speed computer and the $P_1$ multiplier. Since the flow through any valve, functioning as an orifice, is:

$$W_f = C A_v \sqrt{p_f - p_m} \qquad (6)$$

(where, C is the flow coefficient, $A_v$ is the area of the flow, and $(p_f - p_m)$ is the pressure differential across the valve), it follows (as will be shown in detail hereinafter) that, with a proper design of the above mentioned flow regulating units, the maximum fuel flow through my normal fuel supply system is in accordance with the equation:

$$W_f = P_1 \cdot \sqrt{T_1} \cdot f(N/\sqrt{T_1}) \qquad (7)$$

which is the same as Equation 1.

In my emergency fuel supply system, which comes into operation only in the event of failure of the normal fuel supply system, the fuel flow to the engine is controlled by an emergency fuel flow regulating valve whose flow area is varied by manually positioning said valve, while the pressure differential across said valve is regulated in accordance with the inlet air absolute temperature and pressure. Both normal and emergency fuel control systems are subject to a maximum speed governor and the normal system is also subject to a maximum temperature device. These devices insure that engine speed and temperature will never exceed certain selected safe values.

In accordance with the above mentioned basic philosophy, it will be seen that my invention, broadly comprehended, comprises in one self-contained package, a fuel and speed control apparatus for a turbojet engine, having a main and an emergency fuel supply and control system, connected in parallel between said engine and a fuel pump, in each of which systems a series of coacting, hydraulically-actuated devices automatically regulate the delivery of fuel to the engine from a constant delivery fuel pump under all engine operating conditions.

Referring now to FIGURE 1 of the drawings, there are shown, as the principal elements of the engine mentioned above: a supporting body 1, an air inlet 2, a multistage air compressor 3, a compressor rotor shaft 4, one each of a number of combustion chambers 5; a series of combustion nozzles 6, each having a fixed slot 7 and an auxiliary slot 8, connected respectively to two generally circular fuel manifolds 9 and 10, by means of conduits 11 and 12, a multistage gas turbine 13, a turbine rotor shaft 14, connected to the compressor rotor shaft 4, a tail pipe 15 for discharging exhaust gases from gas turbine 13; a center bearing 16 and end bearings 17 and 18, supported by body 1; a propeller shaft 19, carrying a propeller 20, and a gear train 21, connecting shafts 4 and 19 for rotating propeller 20 at a speed proportional to engine speed and for operating the fuel pump and other accessories. The construction of a turbojet engine used solely for jet propulsion is similar to that of the engine shown in FIGURE 1, except for the omission of the propeller shaft 19 and corresponding modification of the gear train 21.

Figure 2:
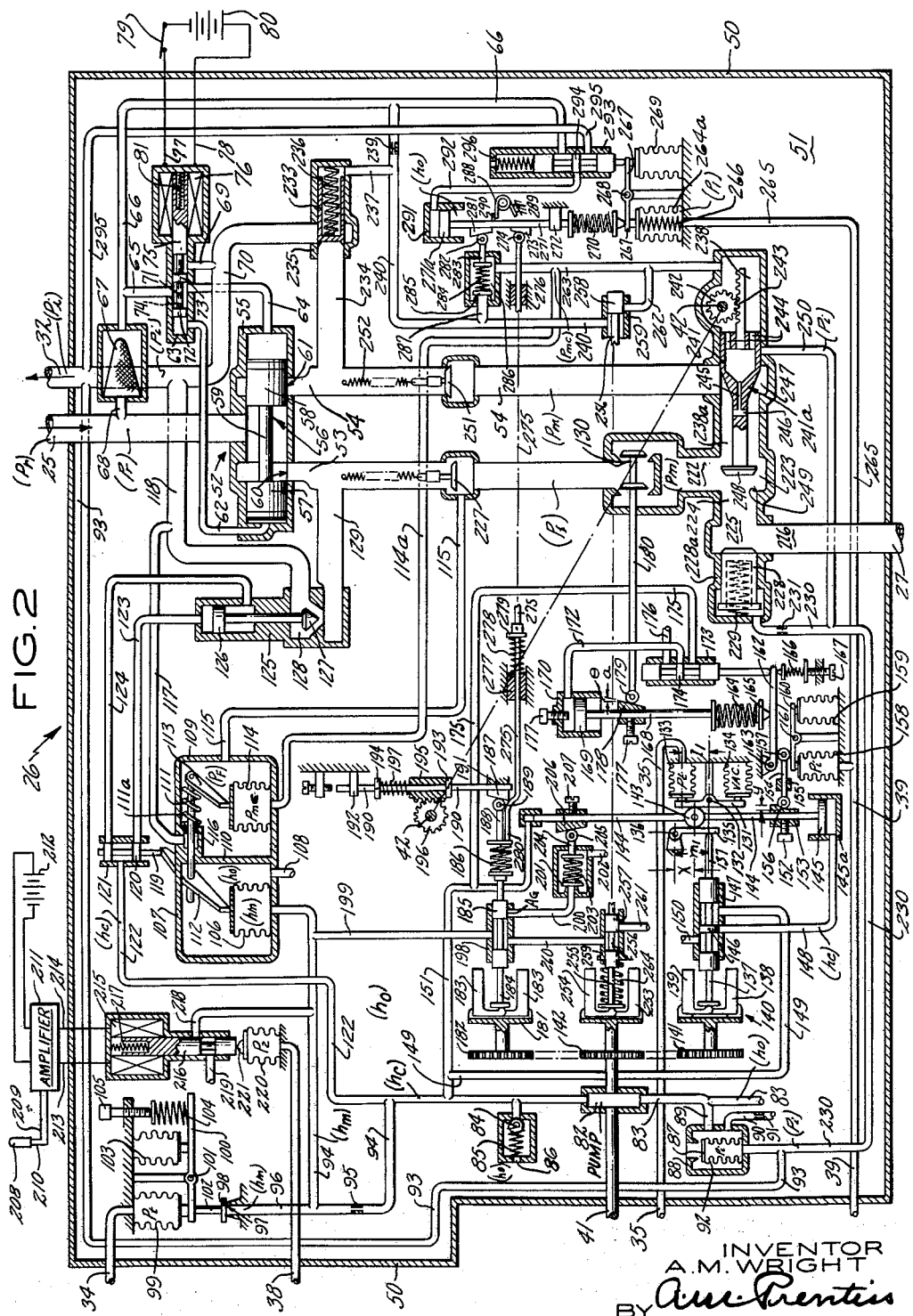
FIGURE 2 shows, also diagrammatically, a control apparatus embodying the principles of my invention.

A constant displacement fuel pump 22 draws fuel from a supply tank 23 through a conduit 24, which may include a boost pump (not shown), and delivers it through a conduit 25 to the fuel flow control apparatus diagrammatically indicated at 26 and shown in detail in FIGURE 2. From fuel control apparatus 26, the fuel flows through a conduit 27 to a pressure-responsive flow-divider 28, and from thence through conduits 29 and 30 to fuel manifolds 9 and 10, respectively, in the engine. Pump 22 is operated by a drive shaft 31 connected to gear train 21 in the engine, or to any other suitable source of power, and a by-pass 32, having a regulating valve 33, is provided to return to pump inlet conduit 24 any fuel in excess of engine requirements. The fuel control apparatus 26 acts to vary the quantity of fuel delivered to the engine per unit of time, as required by the operating conditions, and the difference between the fuel delivered by the pump 22 and the quantity required by the engine is by-passed through a plurality of relief valves in the fuel control apparatus 26 and returns to the inlet side of the pump through conduit 32.

In each of the combustion nozzles 6 there is a series of fixed slots, one of which is indicated at 7, through which fuel enters the nozzles 6 from conduit 11. The fuel flow from the nozzles is directly proportional to the effective area of slots 7 and is a square root function of the drop across the nozzles between the pressure in conduit 11, which is substantially equal to the pressure $(p_m)$ in conduit 29, and the pressure $(P_2)$ in the combustion chamber 5. As it is desired to limit the range of fuel pressures so that their value at maximum fuel flow is less than that corresponding to the square root function of the drop across slots 7, the nozzles 6 are provided with auxiliary slots 8 supplied by manifold 12 connected to the pressure-responsive flow-divider 28 which opens at a predetermined value of the pressure $(p_m)$ in conduit 27. In this manner, the pressure $(p_m)$ may be maintained sufficiently high to produce satisfactory nozzle discharge without requiring the fuel regulator 26 and pump 22 to operate under unfavorable pressure conditions at maximum flow.

The fuel flow control apparatus indicated as 26 in FIGURE 1, and shown diagrammatically in FIGURE 2, is connected by conduits 34 and 35 respectively to bulbs 36 and 37, each of which contains an expansible fluid responsive to the temperature of the air entering the compressor 3 through air inlet 2. Control apparatus 26 is also connected by a conduit 38 to the compressor discharge chamber in the engine, and by a conduit 39 to a Pitot tube 40, located in air inlet 2, which measures the total pressure of the air entering inlet 2. As subsequently explained, the fuel control apparatus 26 is responsive to the inlet air (ambient atmospheric) absolute temperature $(T_1)$, to the absolute total pressure $(P_1)$ of the inlet air, and to the compressor discharge pressure $(P_2)$.

A main drive shaft 41 in fuel control apparatus 26 is driven by the engine at a speed proportional to engine speed and a manual control shaft 42 is rotated in response to movement of a shaft 43 to which is fixed the engine control lever 44. Control lever 44 is manually operable in reference to a scale 45 on a fixed quadrant 46, the scale 45 being calibrated in terms of engine speed (r.p.m.).

Referring to FIGURE 2, there is shown, somewhat diagrammatically, an embodiment of my invention, indicated by the reference numeral 26 in FIGURE 1, all the elements of which are enclosed in a casing 50 which is connected by conduits 34 and 35 to temperature bulbs 36 and 37 in air inlet 2, by conduit 38 to the compressor discharge chamber, and by conduit 39 to Pitot tube 40 for supplying air to the control apparatus at inlet air total pressure $(P_1)$. The control apparatus shown in FIGURE 2 is a self-contained hydraulic system employing the interior of casing 50 as a reservoir 51 which is maintained approximately full of liquid at a pressure $(h_0)$, in order to permit the working elements to operate in a lubricating bath, and to furnish a common lower pressure $(h_0)$ for the hydraulic pressure differentials that motivate the several control devices inclosed in casing 50.

CHANGE-OVER VALVE

Referring first to FIGURE 1, fuel flows from tank 23 through conduit 24 to fuel pump 22, at a pump inlet pressure $(p_i)$, either under a gravity head as shown in FIGURE 1, or from a boost pump (not shown) between tank 23 and main fuel pump 22. As shown in FIGURE 2, fuel issuing from pump 22, under a pump discharge pressure ($p_r$), flows through conduit 25 to a double-acting, change-over valve 52 which has two outlet conduits 53 and 54 for respectively conducting fuel to the normal and emergency control systems hereinafter described. Change-over valve 52 comprises a hollow, cylindrical casing 55, closed at each end, in which is slidably mounted a spool valve 56 having two identical piston portions 57 and 58 connected by a reduced mid-portion 59. Pistons 57 and 58 are adapted to reciprocally vary the areas of ports 60 and 61, respectively and thereby control the fuel flow through conduit 53 in the normal control system and through conduit 54 in the emergency control system, depending upon position of valve 56.

The left end of casing 55 is connected by a conduit 62 to the left end of a servo valve cylinder 63, and the right end of casing 55 is connected by a conduit 64 to the midportion of cylinder 63 which latter is also connected by conduits 65 and 66, filter 67 and conduit 68 to main fuel inlet conduit 25. The right end of cylinder 63 is also connected by conduits 69 and 70 to fuel return conduit 32. Slidably mounted in cylinder 63 is a spool servo valve 71, having two end lands 72 and 73 connected by a reduced central portion which is provided with a bore 74. Servo valve 71 is attached by a stem 75 to a solenoid 76 which is connected through wires 77 and 78 and switch 79 to a battery 80 outside casing 50 of fuel control apparatus 26. When solenoid 76 is energized by manually closing switch 79, servo valve 71 is moved to its rightmost position, as shown in FIGURE 2, whereupon fuel at pump discharge pressure ($p_r$) is introduced through conduits 68, 67, 65 and 64 to the right end of casing 55, and fuel escapes from the left end of casing 55 through conduit 62, bore 74, and conduits 69 and 70 to fuel return conduit 32 where the pressure in pump inlet pressure ($p_i$). Since pump discharge ($p_r$) in the right end of casing 55 greatly exceeds the pump inlet pressure ($p_i$) in the left end of casing 55, valve 56 is moved to its leftmost position, as shown in FIGURE 2. So long as solenoid 76 is energized as just described, valve 56 remain in its leftmost position wherein the fuel flowing through inlet conduit 25 is discharged through open orifice 60 into conduit 53 of the normal fuel control system.

If solenoid 76 is deenergized by manually opening switch 79, servo valve 71 is pushed to its leftmost position by a spring 81, whereupon, fuel at pump discharge pressure ($p_r$) enters the left end of casing 55 and fuel escapes from the right end of casing 55 to return conduit 32 under a pump inlet pressure ($p_i$). This causes valve 56 to shift to its rightmost position which cuts fuel from inlet 25 off from conduit 60 and discharges it into conduit 54 of the emergency fuel control system. From the foregoing, it follows that fuel will flow through the normal control system as long as solenoid 76 is energized, and when said solenoid is deenergized the fuel flow will be changed from the normal to the emergency control system.

NORMAL CONTROL SYSTEM

Hydraulic pressure for operating the mechanisms contained in casing 50 is furnished by a constant displacement pump 82, which is driven by shaft 41 connected to the engine through gear train 21, and draws the operating liquid (e.g., oil) from reservoir 51 through inlet conduit 83. The discharge pressure of pump 82 is maintained at a selected value ($h_c$) by a relief valve 84, biased towards closed position by a spring 85. When the pump discharge pressure exceeds the setting of spring 85, valve 84 opens and permits liquid to escape through outlet 86 back into reservoir 51. The liquid in reservoir 51 is maintained at a regulated pressure ($h_o$) by a relief valve 87 which is mounted in a chamber 88, connected by a conduit 89 to pump inlet conduit 83, and is provided with a return outlet 90, having a restriction 91 communicating with reservoir 51. Valve 87 is biased toward its seat by a bellows 92 whose interior is connected through a conduit 93 and conduit 32 to the inlet side of fuel pump 22. The pressure ($p_o$) in reservoir 51 is thus regulated by the fuel pump inlet pressure ($p_i$).

Metering Head Control

Liquid discharged by pump 82 and not by-passed back to reservoir 51 through valve 84, flows through a conduit 94 having a restriction 95 which reduces the pressure from ($h_c$) to a somewhat lower pressure, regulated pressure ($h_m$). A conduit 96, connected to conduit 94, terminates in an outlet port 97 which communicates with reservoir 51 and is controlled by a valve 98 that is biased toward closed position by a bellows 99, whose interior is connected through conduit 34 to bulb 36 in air inlet 2 of the engine. By means of a lever 100, which rocks about a fixed pivot 101 and is connected to bellows 99 through valve stem 102 of valve 98, the thrust of bellows 99 is opposed by a completely evacuated bellows 103 and an adjustment spring 104 whose tension is adjusted by a set screw 105. Bulb 37 is filled with a dry gas whose pressure ($P_t$) is responsive to the temperature of the air entering inlet 2, and since the pressure in bellows 103 is zero, it is apparent that the movement of valve 98 (and hence the pressure ($h_m$) in conduit 94) is responsive to the inlet air absolute temperature ($T_1$). The device 96–105 just described will be hereinafter referred to as the "metering head control."

Metering Head Detector

Conduit 94 is connected to the interior of a bellows 106 which is mounted in a chamber 107 communicating through an outlet 108 with reservoir 51, so that bellows 106 is surrounded with liquid at pressure ($h_o$). A sealed chamber 109 adjoins chamber 107 and is separated therefrom by a partition wall 110 in which is journalled a rocker shaft 111 having, attached near its left end a rocker arm 112 which contacts the movable upper end of bellows 106, and attached to its right end a similar rocker arm 113 which contacts the movable upper end of a bellows 114 mounted in chamber 109. A torsion spring 111a, coiled around shaft 111, with its right end fixed to said shaft and its left end attached to the upper wall of chamber 109, is so tensioned as to bias the lower ends of arms 112 and 113 against the tops of bellows 106 and 114, respectively. A conduit 115 connects chamber 109 with conduit 53 of the normal fuel control system, so that said chamber is filled with fuel under a pressure ($p_f$) in conduit 53, upstream of the main metering valve to be described hereinbelow. In order to avoid leakage of fuel from chamber 109 into chamber 107, shaft 111 is provided with a packing gland 116, which is drained by a conduit 117 connected (through a conduit 118) with fuel return conduit 32. The interior of bellows 114 is connected with the normal and emergency fuel control systems (as will be more fully described hereinbelow) by a conduit 114a which permits bellows 114 to be filled with fuel under a control fuel pressure ($p_{mc}$). By virtue of the mechanism just described, it is apparent that the contacting end of rocker arm 112 is moved upwardly by the expansion of bellows 106, arm 113 will be moved upwardly by rotation of shaft 111, with a corresponding expansion of bellows 114, and vice versa; and since the top areas of bellows 106 and 114 are made equal, arms 112 and 113 are in equilibrium when the pressure differential ($h_m - h_o$) is equal to the pressure differential ($p_f - p_{mc}$).

The end of arm 112 remote from bellows 106 contacts the lower end of a stem 119 attached to a spool pilot valve 120 which is slidably mounted in a sleeve 121. The interior of sleeve 121 is connected by a conduit 122 to conduit 94 and by conduits 123 and 124 to the top and bottom, respectively, of a cylinder 125 wherein is mounted a piston 126 which actuates a fuel by-pass valve 127. When arm 112 is in its equilibrium position, the lands on pilot valve 120 just cover the ports of conduits 123 and 124, so that no liquid can enter or leave cylinder 125. When bellows 106 contracts, arm 112 moves pilot valve upwardly from its neutral position, so that liquid under pressure ($h_c$) flows through conduits 122 and 124 into the bottom of cylinder 125, while liquid from the top of said cylinder escapes through conduit 123 back into reservoir 51. This causes an upward movement of piston 126 and opening of valve 127. Conversely, an expansion of bellows 106 moves pilot valve 120 in a downward direction which causes a downward movement of piston 126 and a closing of valve 127.

The chamber 128 of valve 127 is connected by a conduit 129 to conduit 53 of the normal fuel control system, and by conduit 118 to return fuel conduit 32; hence the movement of valve 127, by controlling the by-pass flow from conduit 53 back to conduit 32, controls the fuel pressure ($p_f$) in conduit 53 upstream of the main metering valve 130 of the normal fuel control system. Since the pressure differential across metering valve 130 is the difference between the unmetered fuel pressure ($p_f$) upstream of said valve, and the metered fuel pressure ($p_m$) downstream thereof, it is apparent that by-pass valve 127 controls the pressure differential ($p_f - p_m$) across metering valve 130 and the mechanism 106–126 just described, controls valve 127, so that the pressure differential ($p_f - p_m$), or metering head, is regulated by mechanism 106–126 which will be referred to hereinafter as the "metering head detector."

The mechanism by which the main fuel metering valve 130 is positioned, so as to control the area of the fuel flow path therethrough, will now be described. This mechanism, which is depicted schematically in the lower central part of FIGURE 2, consists of two coacting devices, hereinafter referred to as "the $N/\sqrt{T_1}$ computer" and "the $P_1$ multiplier."

The $N/\sqrt{T_1}$ Computer

We will first consider the $N/\sqrt{T_1}$ computer which comprises the following elements. A lever 131, pivoted at 132, contacts the movable ends of a pair of bellows 133 and 134 whose end areas are equal. The interior of bellows 133 is connected by a conduit 35 to bulb 37 in air inlet 2 (FIGURE 1), which is filled with dry gas whose pressure ($p_t$) is responsive to the temperature of the air entering inlet 2; while the interior of bellows 134 is evacuated to zero pressure. Thus, the pressure ($p_t$) in bellows 133 tends to rotate lever 131 in a counter-clockwise direction, in opposition to bellows 134. A second lever 135, pivoted at 136, is connected through a push rod 137 to a pair of flyweights 138 and 139 of a centrifugal speed governor 140 which is driven through connecting gears by shaft 41 which is in turn driven by the engine through gear train 21 (FIGURE 1). The rightward push of flyweights 138, 139 on rod 137 tends to rotate lever 135 in a counter-clockwise direction, and vice versa. Between levers 131 and 135 is a contacting movable roller 143 which is pivoted to a piston rod 144, attached to a power piston 145, which is slidably mounted in a cylinder 145a. Integral with push rod 137 is a spool servo valve 146 which is slidably mounted in a sleeve 147 whose interior is connected by a conduit 148 to the lower end of cylinder 145a, and by conduits 149, 151, and 122 to conduit 94. Sleeve 147 also communicates with reservoir 51 through an outlet 150.

The leftward thrust, $F_1$, of bellows 133 acting on lever 131 with a lever arm $l_1$, compresses roller 143 between levers 131 and 135 with a force of X which is equal to $F_1 l_1/(m_1 - x)$. Force X acts on lever 135 with a lever arm $x_1$ creating a clockwise moment of rotation of lever 135 about its pivot 136 of Xx, which is opposed the rightward thrust, $F_2$, of push rod 137 by flyweights 138, 139, acting with a lever arm of $m_1$ and creating a counter moment of rotation of lever 135 about its pivot 136 equal to $F_2 m_1$. Hence the force X, acting on lever 135 is equal to ($F_2 m_1$)/x. The rod 144 has sufficient resiliency to permit its slight lateral deflection, as required for the small movements of levers 135 and 131 by the forces X and $F_2$. When the system is in equilibrium, the two values of X are equal, so that for equilibrium, $$F_1/F_2 = \frac{(m_1 - x)m_1}{x l_1} \quad (8)$$

Since the fixed distances, $m_1$ and $l_1$ are constant, the equilibrium ratio of $F_1/F_2$ depends upon the value of x, i.e., the position of the roller 143.

When the system is in equilibrium, the servo valve 146 is in its neutral position where its central land just covers the port of conduit 148 and no liquid can enter or leave cylinder 145a, thus fixing the position of the roller 143. With roller 143 in any given position, any increase in the leftward thrust, $F_1$, of bellows 133 will displace valve 146 to the left and admit liquid under pressure ($h_c$) into the bottom of cylinder 145a and produce an upward thrust on piston 145 which is opposed to the downward thrust on rod 144 of the liquid under pressure ($h_c$) acting on the top of rod 144 from conduit 151, connected to conduit 94. Since the pressure in cylinder 145a is also ($h_c$) and the area of piston 145 greatly exceeds the top area of rod 144, piston 145 will move upwardly and change the position of roller 143, decrease the distance x, until the equilibrium of the system is restored. Conversely, any increase in the rightward thrust, $F_2$, of flyweights 138, 139 on rod 137, beyond an equilibrium value of $F_2$, will move servo valve to the right, and permit liquid to escape from cylinder 145a through conduit 148 and outlet 150 into reservoir 51 at a pressure of ($p_o$). The pressure ($h_c$) which exceeds ($h_o$) will then push rod 144 down and increase the distance x, until equilibrium of the system is restored.

From what has been shown above, it is clear that the movement of piston 145 depends upon the ratio of the thrusts $F_1$ of bellows 133 and $F_2$ of flyweights 137, 138. Since the thrust of bellows 133 is proportional to the temperature $T_1$, and the thrust of flyweights 137, 138 is proportional to the square of the engine speed ($N^2$), the value of x is proportional to $N/\sqrt{T_1}$ and when the system is in equilibrium, there is a value of x for every value of $N/\sqrt{T_1}$.

Mounted adjustably by set screws 152 on rod 144, and moving equally with roller 143, is a cam 153, known as the "function cam," which receives the same displacement "x," as the roller 143 for a given value of $N/\sqrt{T_1}$. Moving at right angles to the axis of rod 144 is link 154, slidably mounted in a pivotally mounted sleeve 155 and carrying at each of its ends, a roller 156 and 157. Roller 156 rides on the profile of cam 153 and displaces link 154 a distance equal to the rise "y" of said cam. Since x is a function of $N/\sqrt{T_1}$, and by virtue of the profile of cam 153, y is function of x, it follows that y is also a function of $N/\sqrt{T_1}$, say:

$$y = \varphi_2(N/\sqrt{T_1}) \quad (9)$$

The $P_1$ Multiplier

We now consider the $P_1$ multiplier mechanism which coacts with the $N/\sqrt{T_1}$ computer just described, and is also a ratio computer similar thereto. This mechanism comprises a pair of bellows 158 and 159 whose movable upper ends (of equal area) contact the ends of a lever 160, pivoted at 161, which contacts roller 157. The interior of bellows 158 is connected by conduit 39 to Pitot tube 40 in air inlet 2 (FIGURE 1), so that the unit pressure in bellows 158 is the total unit pressure of the air entering inlet 2. Bellows 159 is evacuated to zero pressure, so that the upward thrust of bellows 158 is proportional to the inlet air absolute pressure ($P_1$).

The upward thrust of bellows 158 on roller 157 is transmitted to a lever 162, pivoted at 163 and is opposed by the downward thrust of a spring 164 transmitted through a disc 165 contacting lever 162. Lever 162 is also biased in an upward direction by a small adjusting spring 166 whose tension may be adjusted by a set screw 167. The force exerted by spring 164 on lever 162 is varied by a piston rod 168 and piston 169 which is slidably mounted in a cylinder 170 whose lower end opens into reservoir 51.

The top of cylinder 170 is provided with an adjustable stop set screw 171 for limiting the upward travel of piston 169 to a selected distance, in order to insure a minimum fuel flow when the engine is started up. The upper end of cylinder 170 is connected by a conduit 172 to the interior of a sleeve 173, in which is slidably mounted a servo valve 174 whose central land just covers the port of conduit 172 when said valve is in its neutral position. A conduit 175 connects the interior of sleeve 173 with conduits 151 and 94, so that when valve 174 moves up from its neutral position, liquid under pressure ($h_c$) flows into the upper part of cylinder 170 and depresses piston 169 which increases the compression and thrust of spring 164 on lever 162. Sleeve 173 also communicates through an outlet 176 with reservoir 51, so that when valve 174 moves down from its neutral position, the liquid in the upper part of cylinder 170 escapes through conduit 172 and outlet 176 back into reservoir 51, whereupon spring 164 pushes piston 169 up and reduces the compression and thrust of said spring on lever 162. Adjustably mounted on piston rod 168 by set screws 177 is a linear cam 178 on whose profile rides a roller 179 which is mounted on the left end of a push rod 180, at whose other end is attached main fuel metering valve 130.

As will be shown hereinafter, the arrangement of the $P_1$ multiplier mechanism just described is such that the movement of roller 157 through a horizontal distance "y" results in a vertical displacement of cam 178 through a corresponding distance "z" which is a selected function of "y," multiplied by $P_1$; and from Equation 9, "y" is a function (say $\varphi_2$) of $N/\sqrt{T_1}$, so that:

$$z = P_1 \cdot \varphi_2(N/\sqrt{T_1}) \quad (10)$$

Equation 10 describes the equilibrium position of the $P_1$ multiplier mechanism, and if this equilibrium is disturbed by a change in $P_1$, or by a movement of the roller 157, the piston 169 is caused to move and change the loading on spring 164 in such a way that said equilibrium is restored. Thus, Equation 10 always holds.

The profile of cam 178 has a slope angle, $\theta$, which determines the ratio of the rise "a" of said profile, in relation to the travel "z" of cam 178. Hence, when cam 178 is displaced through a distance "z" it transmits to rod 180 a horizontal movement "w," such that:

$$w = az \quad (11)$$

When rod 180 and valve 130 are moved a distance "w," the port area, $A_v$, through said valve is varied according to the following equation:

$$A_v = 2\pi D w \sin \theta \quad (12)$$

where D is the valve diameter and $\theta$ is the semi-cone angle of the valve seat profile. The fuel flow through valve 130 is then:

$$W_f = C \cdot 2\pi D \cdot w \cdot \sin \theta \sqrt{p_f - p_m} \quad (13)$$

Now from Equations 10 and 11 above, $$w = a \cdot P_1 \cdot \varphi_2(N/\sqrt{T_1}) \quad (14)$$

As will be shown hereinafter, the pressure differential ($p_f - p_m$) across valve 130 is equal to a constant, K, multiplied by the inlet air temperature, $T_1$ or $$(p_f - p_m) = KT_1 \quad (15)$$

Substituting the value of "w" from Equation 14 and the value of ($p_f - p_m$) from Equation 15 in Equation 13, we have $$W_f = C2\pi D \cdot \sin \theta \cdot a \cdot P_1 \cdot \varphi_2 \cdot (N/\sqrt{T_1} \cdot \sqrt{KT_1}$$
$$= P_1 \sqrt{T_1} \{C2\pi D \cdot \sin \theta \cdot a\sqrt{K} \cdot \varphi_2(N/\sqrt{T_1})\} \quad (16)$$

Since everything within the brackets of Equation 16, except ($N/\sqrt{T_1}$), is constant, the bracketed term can be written as $f(N/\sqrt{T_1})$, and Equation 16 becomes:

$$W_f = P_1\sqrt{T_1} \cdot f(N/\sqrt{T_1})$$

or $$W_f/(P_1\sqrt{T_1}) = f(N/\sqrt{T_1}) \quad (17)$$

As Equation 17 is the same as Equation 1 in column 4 above, the mechanism described hereinabove will achieve the objective of metering, for automatic acceleration, the corrected fuel flow as a predetermined, selected function of connected engine speed, which is the first and primary object of the normal fuel control system hereinabove described.

Speed Control Mechanism
(Steady State Operation)

Having provided for automatic acceleration of the engine speed (r.p.m.) under any conditions of inlet air pressure and temperature, it is necessary now to provide a steady state engine speed control, so that when the engine has accelerated to the speed N, corresponding to the position of the pilot's control lever 44 (FIGURE 1), the acceleration is checked, and the engine continues to run in equilibrium at the selected speed. This is the function of the steady state speed control mechanism which comprises the following elements.

A main centrifugal speed governor 181, driven by the engine through gear train 21, pump drive shaft 41, and connecting gears 142 and 182, has a pair of flyweights 183 which contact the left end of a stem 184 attached to a spool pilot valve, so as to move said valve to the right when said flyweights move outwardly with increase of engine speed, and vice versa.

Valve 185 is loaded, in opposition to the thrust of flyweights 183, by a spring 186, whose degree of compression can be varied by a manually operated cam 187 arranged to transmit a thrust to the left end of spring 186 through a push rod 188 which carries a roller 189 that rides on the profile of said cam. Cam 187 is attached to a push rod 190 which is slidably mounted in fixed, aligned brackets 191 and 192 and carries a pair of fixed collars 193 and 194. Slidably mounted on rod 190 between collars 193 and 194 is a sleeve rack 195, whose teeth mesh with a cog 196 attached to the shaft 42, which is connected to shaft 43 of the pilot's manual control lever 44 (FIGURE 1). Rack 195 is biased in a downward direction by a spring 197 interposed between the top of said rack and collar 194. When cog 196 is rotated in a counterclockwise direction by advancing manual control lever 44 (to the right, FIGURE 1), rack 195 which bears against spring 197 pushes rod 19 and and cam 187 up. This causes rod 188 to move to the left and increase the compression and load of spring 186 on valve 185, whereupon valve 185 is moved to the left against the thrust of flyweights 183. Conversely, when cog 196 is rotated in a clockwise direction, it lowers rack 195 which in turn lowers rod 190 and cam 187 which decreases the load of spring 186 and permits push rod 188 and valve 185 to move to the right.

Valve 185 is slidably mounted in a sleeve 198 which is connected to conduit 94 by a conduit 199, so that liquid under pressure ($h_m$) is introduced into sleeve 198. Sleeve 198 is also provided with a conduit 200 which, when valve 185 is moved to the right, opens communication through a port of area, $A_g$, leading to said conduit 200 whereby liquid escapes past a valve 201 and outlet 202 into reservoir 51 as will be further described hereinafter.

From the arrangement of the speed control mechanism just described, it is clear that when the engine speed is low, the force exerted by flyweights 183, tending to move push rod 184 to the right, is not sufficient to overcome the leftward force of speeder spring 186, and consequently land 185 covers the port of conduit 200, and the port area $A_g$ is zero.

Under these conditions the control system, as was above described, delivers to the engine a maximum permissible "corrected" fuel flow which is at each instant a function of the "corrected" speed. Since this maximum fuel flow is always greater, at each instantaneous speed, than what is required for steady running of the engine, it is apparent that under these conditions the engine will accelerate in speed.

When the speed has increased sufficiently, the rightward force exerted on rod 184 by the flyweights 183 will overcome the force of speeder spring 186, and the valve land 185 will, at some value of the speed, begin to uncover the port leading to conduit 200, causing a port area $A_g$ to exist between conduits 199 and 200.

A passage now exists from conduit 199, through port $A_g$ and conduit 200, through the lightly loaded check valve 201 (whose purpose is disclosed later) and conduit 266 into the reservoir 51, where the hydraulic pressure is $h_o$.

The establishment of this passage provides a means for escape of fluid from passage 199 to the reservoir 51, and it will be plain that when the area of port $A_g$ becomes sufficiently large, the fluid flow through bleed 95, which formerly escaped through valve 98 to reservoir 51, will now be entirely transferred to port $A_g$, and that the pressure $h_m$ in conduit 199 and in bellows 106 will now be a function of $A_g$, that is, of the engine speed. The pressure differential $(h_m - h_o)$, after opening of port $A_g$, thus becomes a function of engine speed N, and not of $T_1$, as was the case prior to opening of port $A_g$.

Figure 5:
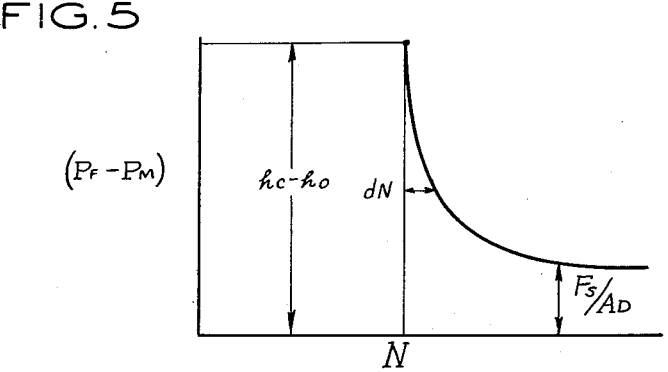
FIGURES 5, 6 and 7 are diagrams showing certain operating characteristics of the apparatus shown in FIGURE 2.

As was described above, the pressure drop $(p_t - p_m)$ of fuel flowing through the main fuel metering valve 130 is always equal to $(h_m - h_o)$, and hence, when the speed governor is acting, $(p_t - p_m)$ decreases with increasing speed N in the manner shown in FIGURE 5.

Since the fuel flow to the engine depends jointly on the port area $A_v$ of main metering valve 130, and on the pressure drop $(p_t - p_m)$, it is also plain that after the speed governor cuts in to provide a port $A_g$ between conduits 199 and 200, the fuel flow to the engine decreases with increasing speed.

The decreasing fuel flow will continue, until an equilibrium speed is reached, at which the fuel flow to the engine has been reduced in the manner just described, from its maximum permissible value to a value that is just what is required to keep the engine running at that speed. This is further elucidated by FIGURE 6, where BC represents the action of the governor in reducing the fuel flow with increasing engine speed, and point C is the equilibrium point between fuel flow required and fuel flow admitted by the governor action.

At this speed the force of flyweights 183, urging rod 184 to the right, just exactly balances the leftward force of spring 186. Accordingly, it follows that during steady state operation, the engine speed will always coincide with that called for by the setting of the pilot's manual control lever 44.

Deceleration Control Mechanism

If the pilot's manual control lever 44 is suddenly retarded (pulled back to the left in FIGURE 1), in order to quickly decelerate the engine, the resulting reduction in fuel flow to burner nozzles 6 may be so great as to cause cessation of combustion in combustion chambers 5, with resulting engine failure. This is known as "burner blowout," and is such a serious danger that special provision must be made in the fuel and speed control apparatus to prevent its occurrence. To this end, the following deceleration control device is added to the speed control mechanism.

When the pilot's manual control lever is suddenly retarded, the loading of spring 186 is correspondingly reduced by the rapid lowering of cam 187. This causes valve 185 to move quickly to the right and open port $A_g$, thereby permitting rapid escape of fuel from conduit 94 through conduits 199 and 200. In order to prevent too high a rate of fuel flow through conduit 200, this flow is regulated by valve 201 which is biased toward closed position by a spring 203 whose force is varied by a push rod 204, carrying a roller 205 that rides the profile of a cam 206. This cam is adjustably mounted in set screw 207 on rod 144 which also carries cam 153, so that the vertical displacements of these cams is always the same and their actions are thereby coordinated.

The lower the position of cam 206, the greater will be the loading on spring 203, with corresponding reduction in the rate of flow through conduit 200. Also, the rate of change in the loading of spring 203 and therefore rate of opening of valve 201, in relation to the movement of cam 206, is governed by the profile of said cam which is contoured so as to make the minimum fuel flow to the engine during deceleration always greater than the burner blowout limit of the engine, thus permitting the greatest possible rate of engine deceleration without failure of combustion at any time. The rate of reduction in fuel flow to the engine is thus regulated to a safe value by the action of cam 206, regardless of how much and how rapidly the manual control lever 44 is retarded, as will be more fully explained hereinafter.

Maximum Temperature Control Mechanism

As was mentioned in column 1 above, while turbojet engines should, for maximum economy of operation, be operated at as high a temperature as is permissible, such engines can not be operated at temperatures which exceed certain predetermined safe values. Accordingly, if the temperature of the engine should rise to a point above such predetermined safe value, damage to the engine turbine, and possible engine failure, will result. In order to avoid this danger, means for over-riding the actions of the fuel control mechanisms previously described, is incorporated in the normal fuel control system. Such means consists of mechanism which functions in response to the temperature, $T_4$, of the exhaust gases in the tail pipe 15 (FIGURE 1) of the engine, and comprises the following elements shown in the left top portion of FIGURE 2.

A thermo-couple 208, responsive to the temperature of its surrounding medium is located in the tail pipe 15 of the engine, so as to be exposed to the exhaust gases therein, as shown in FIGURE 1. Wires 209 and 210 connect thermocouple 208 with an amplifier 211, which receives electrical energy from a battery or other source, 212, and transmits by wires 213, 214, the amplified thermocouple signal to a solenoid 215. The armature of solenoid 215 is connected to a spool valve 216 which is biased in a closing direction by a spring 217, so that as long as the current output of the amplifier 211 is below a selected value, the port of a conduit 218, connected to conduit 94, is closed.

When the output current of the amplifier 211 reaches a certain predetermined value, corresponding to the value of electromotive force from thermocouple 208 at a selected exhaust gas temperature, $T_4$, the magnetic pull of solenoid 215 overcomes the force of spring 217, and the port of conduit 218 begins to open up, giving a flow area, $A_t$, which is proportional to the increment of temperature above $T_4$ at which port, $A_t$, begins to crack open. Upon the opening of said port, liquid escapes from conduit 94 through conduit 218 and an outlet 219 into reservoir 51. This causes a corresponding decrease in the control pressure $(h_m)$ in conduit 94 which reduces the fuel flow to the engine by opening by-pass valve 127 as hereinbefore described, with resulting decrease in temperature, $T_4$, until said temperature falls below the selected maximum safe value, at which point, valve 216 closes the port of conduit 218 and the equilibrium of the system is restored.

From the foregoing description, it will be seen that the maximum temperature control mechanism is a simple proportional control, in which the fuel flow to the engine is reduced by an amount that is proportional to the excess temperature above same selected safe value. The operation of the maximum temperature control apparatus will be further described hereinbelow.

*Compressor Discharge Pressure Limiter*

Like the engine temperature ($T_4$), there is a certain predetermined maximum compressor discharge pressure which can not be exceeded without liability of damage to the engine, and in order to obviate the occurrence of excessive compressor discharge pressures, there is provided special means to this end which comprises the following elements.

A bellows 220, connected by conduit 38 to the compressor discharge chamber in the engine (FIGURE 1), is fixedly positioned just below, and in alignment with, valve 216, as shown in the upper left portion of FIGURE 2. The upper movable end of bellows 220 is provided with a central lug 221 which just clears the bottom of valve 216 when said valve is in its normal lowest position (as shown in FIGURE 2), and the compressor discharge pressure does not exceed the selected maximum safe limit. When said limit is reached, lug 221 contacts the lower end of valve 216 and any further increase in compressor discharge pressure causes bellows 220 to raise valve 216 and thereby open the port of conduit 218. This results in a reduction of the rate of fuel flow to the engine, in the same manner as just described for the maximum temperature control mechanism, and thereby reduces the compressor discharge so that said pressure never exceeds the selected maximum safe value.

*Fuel Inlet Pressure Compensator*

Returning now to the main fuel flow channel of the normal control system, it will be seen that after passing main fuel metering valve 130, the metered fuel flows through a passage 222, chamber 223, passage 224, chamber 225, passage 226 and conduit 27 to the engine. In conduit 53 there is provided a check valve 227, biased toward closed position by an attached tension spring, whereby the fuel pressure is reduced from fuel pump discharge pressure ($p_r$) to a slightly lower unmetered fuel pressure ($p_t$), which is the upstream pressure across the main fuel metering valve 130.

Since the maintenance of a suitable metering pressure drop ($p_t-p_m$) across the main metering valve 130 is achieved by the action of the main by-pass valve 127, which by-passes to the pump inlet that portion of the total pump discharge that is not required by the engine, it is clear that the pressure in conduit 129 upstream from by-pass valve 127 must always be kept greater than the pump inlet pressure ($p_i$). However, under some conditions of boosted inlet pressure, $p_i$ may be relatively high, and if the demand of the engine for fuel is at the same time low, the pressure of the fuel in conduit 27 may be low.

It is therefore necessary to provide means to ensure that the pressure level in conduit 129 is always sufficient to enable the by-passed fuel to escape through valve 127.

This means is provided in the pressure compensating device in chamber 225. This device comprises a hollow piston valve 228 which is slidably mounted in a cylinder 228a, adjacent chamber 225, and is arranged to vary the port opening of passage 226. Valve 228 is biased toward closed position by a spring 229 and fuel under pump inlet pressure ($p_i$) which is introduced into the left end of cylinder 228a through a conduit 230, which is connected to conduit 93 and fuel return conduit 32. Since fuel under pressure ($p_m$) acts on the right side of valve 228, said valve will remain in its open position (as shown in FIGURE 2), as long as the pressure ($p_m$) in chamber 225 exceeds the pump inlet pressure ($p_i$), plus the force of spring 229. If, however, the metered pressure ($p_m$) should fall below this equilibrium value, valve 228 will move toward closed position by reason of the greater force of spring 229, plus pump inlet pressure ($p_i$), thereby reducing the flow through conduit 27 and raising the metered fuel pressure ($p_m$) downstream of the main fuel metering valve 130, until equilibrium is restored between ($p_m$) and ($p_i$) as determined by the rate of spring 229. A restriction 231 in conduit 230, reduces the affect of large, sudden fluctuations in the fuel pump inlet pressure ($p_i$).

EMERGENCY FUEL CONTROL SYSTEM

The emergency fuel regulating system of the control apparatus comprises four coordinated control units as follows:

(1) A by-pass relief valve 233 for regulating the pressure ($p_r$) of the fuel in conduit 54, when change-over valve 56 is in its emergency operating (right) position.

(2) A fuel metering valve 241, operated manually by the control lever 44, whereby the pilot, by suitably adjusting the position of said lever, can obtain any particular engine speed he desires throughout the permissible operating range of the engine.

(3) A topping speed governor for limiting the maximum engine speed to a selected safe value.

(4) An altitude compensator for modifying the fuel flow to the engine in accordance with variations in flight altitude.

Upon entering the emergency fuel control system through conduit 54, fuel in excess of engine requirements flows through a conduit 234 and by-pass relief valve 233 which is slidably mounted in a cylinder 235 and is biased toward its closed position by a spring 236, so as to vary the opening of outlet conduit 70 through which the excess fuel is returned to conduit 32 and the inlet side of fuel pump 22. The right end of cylinder 235 is connected through a conduit 237, conduit 240, restriction 239, conduit 66, filter 67 and conduit 68 to fuel inlet conduit 25, so that fuel under pump discharge pressure ($p_r$) acts on the right side of valve 233 in opposition to the fuel pump discharge pressure ($p_r$) in conduit 234 acting on the other side of said valve. Since the same pressure ($p_r$) acts on both sides of valve 233 (except when there is a fuel flow through conduit 240, as hereinafter described), valve 233 maintains the fuel pressure in conduit 54 at a substantially constant value, as determined by the rate of spring 236.

Fuel entering the emergency fuel regulating system through conduit 54 also flows through said conduit to manual control valve 241 whose head 241a is specially contoured with reference to the outlet of conduit 54, so as to function as the main fuel metering valve of the emergency control system. Valve 241 is slidably mounted in cylindrical chamber 238 and is manually operated by control lever 44 through connected shafts 43 and 42, a cog 242 and a rack 243, and is provided with passageways 244, 245 and 246 by which fuel passes from valve chamber 238 through passage 238a to chamber 223 and thus hydraulically balances valve 241.

Integral with valve 241 is a stop cock valve 248 which, when advanced to its leftmost position, contacts its seat 249 and stops all flow of fuel from either the normal or emergency control systems to the engine, when it is desired to stop the engine. When valve 248 is in its closed position, the right end of valve 241 opens the port of a conduit 250 which connects with conduit 230, whereupon fuel in conduit 54 flows through passageways 246, 245 and 244, and conduits 250, 230, 93 and 32 to the inlet side of fuel pump 22, thereby reducing the pressure in conduit 54 to fuel pump inlet pressure ($p_i$).

In conduit 54, there is provided a check valve 251, biased toward closed position by a spring 252, which prevents any back flow of fuel from the normal fuel control system when said system is in operation and the emergency control system is inoperative. Similarly, check valve 227 in conduit 53 prevents any back flow of fuel from the emergency control system when said system is in operation and the normal control system is inoperative.

During operation of the emergency control system, the fuel pump inlet pressure ($p_1$) compensating valve 228 functions in the same manner as when the normal fuel control system is in operation.

MAXIMUM SPEED (TOPPING) GOVERNOR

While the main speed governor, 181, of the normal control system controls engine speed, during steady state operation, throughout the speed operating range of the engine, it has been found necessary to provide additional means for positively preventing the speed of the engine from exceeding its maximum safe limit at all times, i.e., both during operation of the normal fuel control system and the emergency system. For this purpose, there is provided a maximum speed (topping) governor, which functions as a component of both the normal and emergency control systems, and comprises the following elements.

A pair of centrifugal flyweights 253, 254, driven by the engine through pump drive shaft 41 and gear train 21, contacts one end of a push rod 255 to which is attached a double spool valve 256, having lands 257 and 258. Valve 256 is slidably mounted in a sleeve 259 which is connected by a conduit 260, through main governor sleeve 198 and conduit 199, to conduit 94 of the normal control system, and is provided with an outlet 261 opening into reservoir 51. Sleeve 259 is also connected by conduits 240 and 237 to cylinder 235 of by-pass valve 233, and by conduits 262 and 263 to chamber 238 of manual control valve 241 of the emergency control system. Upon increase of engine speed, flyweights 253, 254 exert a thrust to the right on valve 256, in opposition to a spring 264, and vice versa; and the calibrations of said flyweights and spring are such that valve 256 remains in its leftmost (closed) position, as shown in FIGURE 2, for all engine speeds below the predetermined, selected maximum safe speed of the engine, and the topping governor has no affect on the operation of either the normal or emergency control system.

However, when the engine speed attains the selected, safe maximum value, the force of flyweights 253, 254 overcomes the force of spring 264 and valve 256 moves to the right, opening outlets 261 and 262, whereupon (in the normal system) hydraulic fluid escapes from conduit 94 through conduits 199 and 260 and outlet 261 into reservoir 51, thereby reducing the control pressure ($h_m$) in conduit 94 which reduces the fuel flow to the engine and hence engine speed, as previously described hereinbefore, until said speed falls below the selected maximum safe value, when spring 264 moves valve 256 to the left and closes outlets 261 and 262.

At the same time, the opening of the port into conduit 262, permits fuel to escape from cylinder 235 through conduits 237, 240 and 262 and valve 241, in the emergency control system, which (owing to restriction 239) reduces the pressure in cylinder 235 from fuel pump discharge pressure ($p_r$) to metered fuel pressure ($p_m$). This causes by-pass valve 233 to move to the right and open the port of conduit 70, which reduces the pressure ($p_r$) in conduit 54, with corresponding reduction in fuel flow to the engine and hence engine speed, when the emergency control system is in operation.

From the foregoing description, it is clear that the topping governor prevents the engine from exceeding its maximum safe speed, irrespective of whether the normal or emergency control is in operation.

Altitude Compensator

Experience in the operation of aircraft driven by turbojet engines at high altitudes, where the ambient atmosphere is much less dense than at lower levels, has shown the necessity for increasing the idling speed of the engine with increasing altitude, in order to avoid engine cut-out. There is accordingly provided in the emergency fuel control system, an altitude compensating mechanism which modifies the action of the pilot's manual control valve 241, so as to furnish an increasing schedule of idle engine speed with increasing altitude and thus maintain engine operation under such flight conditions.

The altitude compensating mechanism comprises the following elements. A bellows 264a, connected by a conduit 265 and 39 to Pitot tube 40 in air inlet 2 of the engine (FIGURE 1), has a movable upper end which is biased upwardly by a spring 266 and bears against the left end of a lever 267, pivoted centrally at 268. A second bellows 269, evacuated to zero pressure, has a movable upper end (of the same area as bellows 264) which bears against the right end of lever 267, so as to oppose the thrust of bellows 264a. In vertical alignment with bellows 264a is an opposing spring 270 whose lower end bears against the left end of lever 267, and whose upper end bears against the lower end of a piston rod 271 which is slidably mounted in a fixed guide 272 and has attached to its upper end a piston 271a. Rod 271 carries a cam 273 on whose profile rides a roller 274, mounted on one end of a push rod 275, which is slidably mounted in a pair of fixed sleeves 276 and 277, and is biased toward cam 273 by a spring 278 interposed between sleeve 277 and an adjustable collar 279 on said rod. At its left end, rod 275 has a finger 280 which is positioned so as to limit the travel to rod 188 to the right.

Rod 271 has a second cam 281 on whose profile rides a roller 282, mounted on one end of a stem 283 which bears at its other end against a spring 284 that serves to load a valve 285 in a chamber 286. Valve 285 varies the opening of a conduit 287 which connects chamber 286 with conduit 240. Chamber 286 is also connected by conduit 263 to valve chamber 238, and by conduit 114a to bellows 114.

Piston rod 271 is biased upwardly by an auxiliary spring 288 which is mounted on a fixed support 289 and engages a lug 290 on said rod. Piston 271a reciprocates in a cylinder 291 which is connected by a conduit 292 to the sleeve 293 of a spool valve 294 which bears at its lower end against the right end of lever 267. Sleeve 293 is connected by conduit 66, filter 67 and conduit 68 to conduit 25; and a conduit 295 connects sleeve 293 to conduit 32. A spring 296 in the top of sleeve 293 opposes the upward thrust of the right end of lever 267.

By virtue of the arrangement of elements of the altitude compensator just described, a decrease in atmospheric pressure ($P_1$), upon increase of flight altitude, reduces the upward thrust of bellows 264a which causes spring 270 to depress the left end of lever 267 and raise its right end against weaker spring 296. This raises valve 294 above its neutral, equilibrium position, as shown in FIGURE 2, and opens the port of conduit 292 which permits fuel to escape from the top of cylinder 291 through conduits 292, 295, 32 to the inlet side of fuel pump 22, thereby reducing the pressure in cylinder 291 to ($p_1$). The now preponderant force of spring 270 raises piston 271a and rod 271, until the decreasing strength of expanding spring 270 again balances the reduced upward thrust of bellows 264a and the force of spring 266, whereupon the system is restored to equilibrium. Conversely, as increase in ($p_1$) upon decrease of altitude operates the mechanism in the opposite manner, so that piston 271a and rod 271 are lowered by the increased pressure in cylinder 291.

When rod 271 and cam 273 are raised from their position shown in FIGURE 2, rod 275 is pushed to the left, whereby finger 280 limits the travel of rod 188 to the right, so that if cam 187 is lowered, by retarding the pilot's manual control lever 44, as hereinbefore described, the loading of spring 186 is determined by the position of finger 280 and not by cam 187. Any variation in flight altitude will then vary the loading of spring 186 in accordance with the profile of cam 273 which is cut so as to cause a selected schedule of fuel flow to the engine and engine idling speed, in relation to flight altitude to be obtained.

Conversely, when cam 273 is lowered, by decrease in flight altitude, finger 280 is moved to the right by spring 278 until it reaches a point corresponding to zero rise on cam 187, whereupon, finger 280 no longer can limit the loading on spring 186 and thereby the speed of the engine.

Similarly, when cam 281 on rod 271 is raised by decrease in ($P_1$), due to barometric changes, the loading on spring 284 is decreased according to the profile of cam 281, and vice versa. Upon a decrease of loading of spring 284, valve 285 opens and permits fuel to escape from conduit 240 at a greater rate than it can enter said conduit through restriction 239. This lowers the pressure in cylinder 235 which causes valve 233 to increase the opening of the port of conduit 70, and thereby lower the pressure ($p_r$) in conduit 54, with corresponding reduction in fuel flow to the engine. Conversely, an increase in ($P_1$) increases the loading on spring 284 which increases the pressure ($p_1$) and the resulting fuel flow to the engine.

The opening of valve 285 may also affect the control pressure ($p_{mc}$) in conduit 114a and bellows 114 in the normal control system, when said opening reaches a point where the area of the flow path through valve 285 exceeds the area of passage 245 in valve 241, in which case the pressure ($p_{mc}$) in chamber 238, conduits 263 and 114a, and bellows 114 will rise above the metered fuel pressure ($p_m$) as valve 285 opens further. When valve 285 is closed, the control pressure ($p_{mc}$) is equal to the metered fuel pressure ($p_m$).

OPERATION

Thus far, I have described the various units and elements of my fuel and speed control apparatus under its three major subdivisions, viz: (1) Change-Over Valve; (2) Normal Fuel Control System; (3) Emergency Fuel Control System. I will now describe the operation of the fuel and speed control apparatus as a whole, beginning with the normal fuel control system.

In order to adequately describe the operation of the normal fuel control system, it is necessary to explain the functioning of certain mechanism by the use of mathematical equations, which involve the following nomenclature, defined as indicated:

$A_{b1}$—Effective area of bellows 133 in corrected speed computer
$A_{b2}$—Effective area of bellows 158 in $P_1$ multiplier
$A_{bt}$—Effective area of bellows 99 in metering head control
$A_m$—Area of face of control valve 98 in metering head control that is exposed to pressure $h_m$
$A_v$—Port area through main fuel metering valve 130
$A_g$—Port area of speed governor spool valve 185
$A_t$—Port area of temperature control spool valve 216
$A_d$—Area of face of deceleration control valve 201 that is exposed to pressure $h_x$
$a, a_0, a_1$, etc.—Constants
B—Hole area of restricting orifice 95
C—Discharge coefficient of a valve
D—Main metering valve 130 seat diameter
$f$—$f(\ )$ denotes a functional relationship
$h$—Travel of speed governor valve 185
$h_c$—Constant hydraulic oil unit pressure
$h_m$—Hydraulic unit pressure in conduit 94 metering head detector bellows 106
$h_o$—Sump or case unit pressure in reservoir 51
K—Constants
$k_n$—Proportional factor between r.p.m. of 140 and force of flyweights 138, 139
$k_t$—Proportional factor between temperature $T_1$ and gas pressure in bellows 133
$k_s$—Spring rate of spring 164
$l_1$—Lever length of lever 131
$m_1$—Lever length of lever 135
$m_2$—Lever length of lever 162
N—Speed (r.p.m.) of engine
$P_1$—Compressor inlet air absolute, total, unit pressure (in air inlet 2)
$P_2$—Compressor discharge air absolute, total, unit pressure
$p_f$—Fuel unit pressure upstream from metering valve 130
$p_m$—Metered fuel unit pressure downstream from metering valve 130
$p_{mc}$—Control unit pressure ($p_m$ modified by $P_1$)
$p_t$—Gas unit pressure in temperature bulbs 36 and 37
$T_1$—Compressor inlet air absolute temperature (in air inlet 2)
$T_4$—Turbine exhaust gas absolute temperature in 15
$W_a$—Rate of air flow through engine
$W_f$—Rate of fuel flow to engine
$W_{fp}$—Rate of fuel pump 22 output
$w$—Lift of main metering valve 130
X—Reaction of fulcrum 143 and levers 131 and 135 of $N/\sqrt{T_1}$ computer
$x$—Output displacement of $N/\sqrt{T_1}$ computer piston 146
Y—Reaction of fulcrum 157 and levers 160 and 162 of $P_1$ multiplier
$y$—Output displacement of function cam 153
$z$—Output displacement of $P_1$ multiplier rod 168

*Greek letters*

Figure 3:
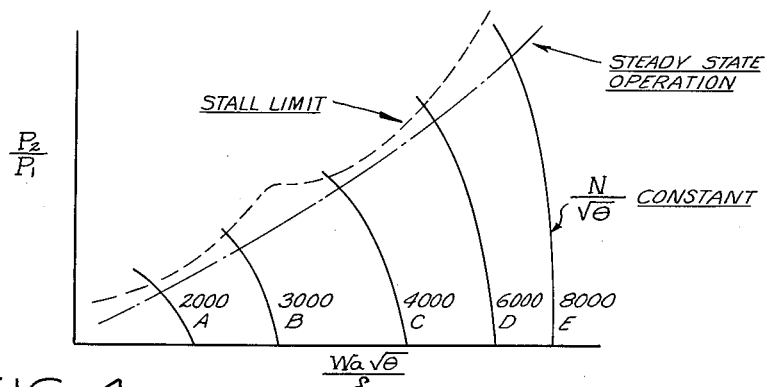
FIGURES 3 and 4 are diagrams of certain operating characteristics of turbojet engines.

$\delta = P_1/14.7$
$\theta = T_1/518.4$; and also semi-cone angle of metering valve 130
$\varphi_1, \varphi_2, \psi$ denote certain functional relationships The performance characteristics of a turbojet engine are usually portrayed in the form of a diagram, such as that shown in FIGURE 3, where the abscissa is a scale of air flow, and the ordinate is a scale of compressor pressure ratio (ratio of compressor discharge pressure ($P_2$) to compressor inlet pressure ($P_1$).

Referring to FIGURE 3, it will be noted that the abscissa is a quantity $W_a\sqrt{\theta}/\delta$, in which $W_a$ is the airflow through the engine
$\theta = T_1/518.4$
$\delta = P_1/14.7$ and line A—E are curves of constant $N/\sqrt{\theta}$. When the compressor inlet temperature, $T_1$, is equal to 518.4° Rankine (59° F.), and $P_1$, the compressor inlet pressure, is 14.7 p.s.i. then $$\theta = 1.00$$

and $$\delta = 1.00$$

In this case the abscissa of FIGURE 3 indicates $W_a$ directly, and the lines of constant $N/\sqrt{\theta}$ read engine speed, N, directly.

The advantage of presenting the engine characteristics in terms of the "corrected" values $N/\sqrt{\theta}$ and $W_a\sqrt{\theta}/\delta$ is that when $T_1$ and $P_1$ have values other than 518.4° R. and 14.7 p.s.i. respectively, the diagram of FIGURE 3 can still be used to represent the engine performance. It is only necessary to determine the seal level characteristic of the engine by test or calculation, and the performance of the engine is then fixed for all conditions of inlet air temperature and pressure.

The engine characteristics, plotted in the manner shown in FIGURE 3, may be used to display more information as to the engine's performance than is shown by FIGURE 3. For instance, lines of constant compressor efficiency, and lines of constant turbine inlet temperature ratio, $T_3/\theta$, may be drawn on the chart. And in particular, lines of constant corrected fuel flow $W_f/(\delta \cdot \sqrt{\theta})$, may be shown. With this extended use of the diagram of FIGURE 3 in mind, it will be seen that at any value of corrected engine speed $N/\sqrt{\theta}$, and at any value of compressor ratio $P_2/P_1$, there is a determinate value of the corrected fuel flow $W_f/(\delta \cdot \sqrt{\theta})$.

Now on the diagram of FIGURE 3 there is a broken line labelled "stall limit." At any value of corrected speed, say 6,000, the intersection of the 6,000 r.p.m. line (curve C) with the stall limit line gives a value of compressor ratio at which the compressor will stall, and at greater compression ratios than this, the engine cannot be operated. From what has just been said, it is evident that the intersection of any constant corrected speed line and the stall limit line also corresponds to a value of the corrected fuel flow, which represents the maximum value of corrected fuel that can be supplied to the engine without encountering compressor stall.

Figure 4:
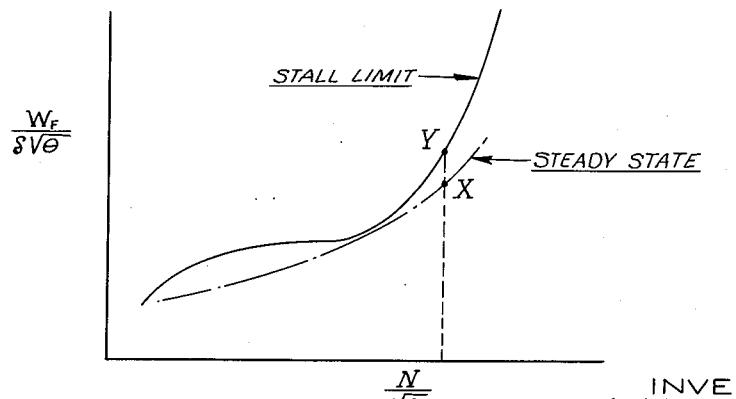

From the diagram of the engine characteristics, then, it is possible to abstract data that enables a curve to be drawn showing maximum allowable corrected fuel flow in terms of corrected speed, as shown in FIGURE 4.

FIGURE 3 also shows a dash-dot line of "steady state" operation. The intersection of this line with the lines of constant corrected r.p.m. (curves A—E) gives the engine compression ratio at which equilibrium exists between the compressor power, turbine power, and exhaust nozzle jet gas flow. At the operating conditions corresponding to points on this line, the engine will run in equilibrium indefinitely.

From what was said above, it is seen that every point on the steady state operating line corresponds to a value of corrected fuel flow, and that a line of corrected fuel flow vs. corrected engine speed can be drawn for steady state conditions, as shown by the dash-dot line of FIGURE 4.

Suppose the engine is operating in a steady state condition at some corrected speed (r.p.m.) and fuel flow, as indicated by the point X in FIGURE 4. If the corrected fuel flow is increased, the equilibrium condition is disturbed and the engine will accelerate. The fuel flow at the particular corrected speed cannot be increased to a value greater than that corresponding to a point Y in FIGURE 4, or the compressor will stall and become inoperative. Conversely, if starting from an equilibrium condition, the fuel flow is reduced, the engine will decelerate.

When turbojet engines are used in aircraft, it is very desirable that the fuel control be such as to permit the engine to accelerate in speed (r.p.m.) as rapidly as possible. For instance, an airplane coming in for a landing with the engines throttled back, may be waved off for some reason, in which case the pilot's control lever would be rapidly advanced to speed up the engines and reestablish thrust as quickly as possible. It is apparent from FIGURE 4 that the maximum fuel flow that can be used for acceleration is that given by the "stall limit" line (leaving out of account the necessity for limiting the turbine temperature to a safe value, which is considered later). It is equally apparent that without elaborate instrumentation and close attention thereto, the pilot can hardly be expected to manually control the fuel flow during engine speed-up so as to attain optimum engine performance. It is therefore necessary to provide an engine controller in which acceleration is controlled automatically to give best performance.

Now from the definitions of $\delta$ and $\theta$ $$W_f/(\delta\sqrt{\theta}) = W_f/(P_1\sqrt{T_1} \times 14.7 \times \sqrt{518.4})$$

$$N/\sqrt{\theta} = N/\sqrt{T_1} \times \sqrt{518.4}$$

FIGURE 4 can therefore be plotted to new coordinates $W_f/(P_1\sqrt{T_1})$ and $N/\sqrt{T_1}$, and there is a functional relationship between these quantities that defines the maximum allowable fuel flow, as indicated by Equation 1 in column 4 above. As stated in column 4, the functional relation "$f$" in Equation 1 may be expanded to as many terms as we please by well known methods, but this leads to the rather complex expression (3) in column 4 and controllers of the type that meter fuel flow as some function of r.p.m. with added compensation for inlet temperature and pressure effects, are in general unable to do more than approximate to the required function. As was also stated in column 4, my improved control apparatus, avoids this difficulty by generating the function "$f$" of Equation 1 directly.

The manner in which the function $$W_f/(P_1\sqrt{T_1}) = f(N/\sqrt{T_1})$$

is generated will now be described.

Referring to FIGURE 2, at the bottom left is shown an oil pump 82 and a pressure regulator 84, whose purpose is to provide a supply of control hydraulic oil at pressure $h_c$.

In the upper right hand part of FIGURE 2, is shown a metering head control 97–105. A temperature sensing bulb 36 is connected to a bellows 99 as shown, and the whole is filled with dry gas. The bulb 36 is mounted in the air stream at the engine inlet 2, so that the gas pressure in bellows 99 is proportional to the absolute temperature of the air stream. Then $$p_t = k_t T_1 \qquad (18)$$

Now consider the equilibrium of the pair of bellows 99 and 103 and the small valve 98; using the notation shown in FIGURE 2 and defined in columns 19–20 above, and equating the upward and downward forces on the gas filled bellows 99, we get:

$$h_m A_m + h_o \cdot A_{bt} = p_t \cdot A_{bt} + h_o \cdot A_m \qquad (19)$$

or the net downward force on the gas filled bellows 99 is $$(h_m - h_o)A_m + (h_o - p_t) \cdot A_{bt} \qquad (20)$$

which exerts a counter clockwise moment about the pivot $$[(h_m - h_o)A_m + (h_o - p_t)A_{bt}]\mathit{l} \qquad (21)$$

The evacuated bellows exerts a clockwise moment about the pivot:

$$h_o A_{bt} \cdot 1 \qquad (22)$$

For equilibrium, these clockwise and counter clockwise moments must be equal, so that $$A_m \cdot (h_m - h_o) = p_t A_{bt} \qquad (23)$$
$$= k_t T_1 A_{bt}$$

or $$(h_m - h_o) = (k_t A_{bt}/A_m) \cdot T_1 \qquad (24)$$

The foregoing is true only when:

(a) There is no reaction between the seat 97 and the valve 98, defined as $A_m$. This absence of reaction is provided by the escape of oil from the pump 82 through restriction 95, which can flow only through $A_m$ of valve 98; and (b) The forces due to the spring effect of bellows 99 is negligible. This is ensured by making restriction 95 very small compared with the escape area $A_m$ of valve 98, so that an extremely small displacement of the bellows 99 is sufficient to control the pressure differential $(h_m - h_o)$. In the top left part of FIGURE 2 is shown a metering head detector 106–119, comprising a pair of equal area bellows 106 and 114, each mounted in a sealed chamber 107 and 109, and connected by a shaft 111 and lever arrangement as shown. The pressure differential $(h_m - h_o)$ is applied to bellows 106.

A fuel pump 22, shown in FIGURE 1, discharges $W_{fp}$ pounds of fuel per hour, of which a portion, $W_f$, flows through the main metering valve 130, and the remainder $(W_{fp} - W_f)$ flows through a by-pass valve 127 to a low pressure region denoted as "pump inlet pressure" which may be the gravity head of a fuel tank 23, or which may be the discharge pressure of a fuel boost pump, located between tank 23 and pump 22.

The function of the metering head detector 106–119, pilot valve 120, and by-pass valve 127 is to maintain the pressure drop $(p_f - p_m)$ across the metering valve 130 equal to the pressure differential $(h_m - h_o)$, which is done as follows.

The pressure drop $(p_f - p_m)$ is applied to bellows 114, in such a way that the pressure differentials $(h_m - h_o)$ and $(p_f - p_m)$ respectively tend to rotate the shaft 111 in opposite directions. When the metering head detector 106–119 is assembled, it is adjusted in such a way that when $(p_f - p_m) = (h_m - h_o)$, the lands of the pilot valve 120 cover the ports leading to the power piston cylinder 125; when these ports are covered, there can be no flow of oil into said cylinder, and the piston and by-pass valve are locked hydraulically in a fixed position.

If now for any reason the pressure $(p_f - p_m)$ should become unequal to $(h_m - h_o)$—as might be the case if the fuel metering valve 130 were to be opened or closed— then the equilibrium balance of the metering head detector 106–119 is disturbed, causing a rotation of the shaft 111, and a displacement of the pilot valve 120 from its neutral or shut-off position. Such displacement of the pilot valve opens the ports leading to the cylinder 125, which connect the control oil pressure line 122 (pressure=$h_c$) to one side of the power piston 126, and connect the other side of said piston to reservoir 51 (pressure=$h_o$). The power piston 126 will now move under the influence of the hydraulic pressure, so as to open up or close the by-pass valve 127.

The pressure drop $(p_f - p_m)$ is established by the flow of fuel through the metering valve 130, so that:

$$(p_f - p_m) = (W_f / CA_v)^2 \quad (25)$$

When $(p_f - p_m)$ is not equal to $(h_m - h_o)$, then the equality may be restored by adjusting the fuel flow $W_f$. In the arrangement shown in FIGURE 2, this adjustment is made by opening or closing the by-pass valve 127, so as to shunt more or less of the fuel pump output from conduit 25 into return line 32, until finally the flow $W_f$ through the metering valve is such as to make $(p_f - p_m)$, in Equation 25 equal to the oil pressure differential $(h_m - h_o)$.

An inspection of FIGURE 2 shows that the displacement of the pilot valve 120 in the metering head detector is proportional to the difference between $(h_m - h_o)$ and $(p_f - p_m)$ and that the motion of the power piston 126 is always in such a direction as to nullify this difference.

The mechanism acts to maintain the relation $$(p_f - p_m) = (h_m - h_o)$$

or, referring to Equation 24 in column 22

$$(p_f - p_m) = (k_t A_{bt} / A_m) T_1 \quad (26)$$

Equation 26 is the same as Equation 15 in column 11, where $$K = k_t \cdot A_{bt} / A_m$$

In FIGURE 2 is shown a fuel metering valve 130, which is moveable by means of the push rod 180, and the mechanism by which the fuel metering valve is positioned will now be described.

This mechanism, as shown schematically in FIGURE 2, consists of two components, the $N/\sqrt{T_1}$ computer, as described in columns 9–10 above, and the $P_1$ multiplier, as described in columns 10–12 above.

Consider first the $N/\sqrt{T_1}$ computer shown in the lower left part of FIGURE 2.

An upper lever 131 is provided, pivoted at 132 and attached to a pair of bellows 133 and 134, of which 134 is evacuated to zero pressure, and the other, 133 is connected to a temperature sensing bulb 37 charged with dry gas so that the pressure in the bulb and bellows is proportional to $T_1$, say $$p_t = k_t T_1 \quad (27)$$

The pressure $p_t$ acting on the assembly tends to rotate lever 131 about its pivot 132 in a counter-clockwise direction.

A lower lever 135 is provided, pivoted at 136 and connected as shown in FIGURE 2 through a push rod 137 to a pair of flyweights 138, 139, driven from the engine, and the rightward push on lever 135 is equal to $k_n N^2$, tending to rotate said lever about its pivot 136 in a counter-clockwise direction.

Between the levers 131 and 135 is placed a moveable roller 143, attached to a hydraulic power piston 145, which in turn is connected to a pilot valve 146 as shown in FIGURE 2, the general scheme of the pilot valve 146 and power piston 145 being similar to that already described in connection with the metering head detector. When the mechanism is in operation, the roller 143 is compressed between the levers, 131 and 135, the reaction between the roller and levers being X units of force. Now for equilibrium of the levers, the moment due to X about the pivot of each lever must balance the moment due to other forces on each lever. Defining the neutral position of the assembly as that in which the bellows 133 and 134 are at their free length, so that there is no force on the system due to spring effect of these bellows, then equilibrium of lever 131 is given by $$[(p_t - h_o)A_{b1} + h_o A_{bt}] \cdot l_1 = X(m_1 - x) \quad (28)$$

and of lever 136 by $$k_n N^2 m_1 = X \cdot x \quad (29)$$

Dividing Equation 28 by Equation 29, we get $$p_t l_1 / (k_n N^2 m_1) = (m_1 - x)/x \quad (30)$$

or $$N^2 / p_t = x l_1 / (k_n m_1) \cdot (m - x) \quad (31)$$

and remembering that $p_t = k_t T_1$, this becomes $$N^2 / T_1 = (k_t / k_n) \cdot (l_1 / m_1) \cdot (x/m - x) \quad (32)$$

or $$N/\sqrt{T_1} = \sqrt{(k_t/k_n)(l_1/m_1)(x/m - x)} \quad (33)$$

Thus, when the mechanism is in equilibrium, there is a value of $x$ for every value of $N/\sqrt{T_1}$.

When the mechanism is assembled, the pilot valve 146 is adjusted so that when the bellows 133 and 134 are at their free length, the port 148 of the pilot valve 146 is closed. Then if the condition of the system at any instant is such that Equation 33 is not satisfied, an inspection of FIGURE 2 shows that the pilot valve 146 is displayed, allowing hydraulic oil to flow into the piston cylinder 145a, moving piston 145 in a direction to restore equilibrium as described by Equation 33. Mounted on the piston rod 144 of the $N/\sqrt{T_1}$ computer, and moving simultaneously with the fulcrum roller 143, is a cam 153 known as the "function cam" which receives the same displacement $x$ as the roller 143 for a given value of $N/\sqrt{T_1}$, as expressed by Equation 33.

Moving at right angles to the $x$-axis of rod 144 is a link 154, the right end of which is provided with a small roller 156 that rides on the profile of function cam 153. The displacement of link 154 is equal to the rise "$y$" of the function cam 153. Since, by virtue of Equation 33, $x$ is a function of $N/\sqrt{T_1}$, and since by virtue of the profile of cam 153, $y$ is a function of $x$, then $y$ is a function of $N/\sqrt{T_1}$, say $$y = \varphi_1(N/\sqrt{T_1}) \quad (34)$$

Considering next the $P_1$ multiplier mechanism, shown in the bottom central part of FIGURE 2, it will by now be apparent that this is another ratio computer similar to the $N/\sqrt{T_1}$ computer.

Again defining equilibrium of the system as that position of the system in which the bellows 158 and 159 are at their free length and the pilot valve 174 is in the shut-off position, we have for equilibrium of the lever 160:

$$P_1 A_{b2} l_2 = Y \cdot y \quad (35)$$

where $P_1$ is the compressor inlet air pressure, introduced into the bellows 158 through conduit 39, and Y is the reaction force between the levers 160 and 162 and the roller 157. The system is so adjusted as to make roller 157 position y inches from the pivot, the same as the rise y of the function cam. Denoting the force of the spring 164 by $F_s = k_s z$, where $k_s$ is the spring rate, then equilibrium of the lever 162 is given by $$k_s z m_2 = Y \cdot (m_2 - y) \quad (36)$$

and dividing Equation 36 by Equation 35, we get:

$$(k_s z m_2)/(P_1 A_{b2} l_2) = (m_2 - y)/y \quad (37)$$

or $$z = (P_1 \cdot A_{b2} l_2)(m_2 - y)/(k_s m_2 y) \quad (38)$$

or since by Equation 34, y is a function of $N/\sqrt{T_1}$, this becomes:

$$z = P_1 \cdot \varphi_2 \cdot (N/\sqrt{T_1}) \quad (39)$$

Equation 39 is the same as Equation 10 in column 11, and describes the equilibrium position of the $P_1$ multiplier mechanism.

An inspection of FIGURE 2 shows that if the equilibrium is disturbed by a change in $P_1$ or by a movement of the roller 157, the power piston 169 is caused to move and change the loading of the spring 164 in such a way that equilibrium is restored. Thus Equation 39 or 10 always holds.

Mounted on the output rod 168 of the $P_1$ multiplier is a cam 178, which is subject to the displacement z. This cam is linear, and has a rise $$w = a \cdot z$$

(see Equation 11 in column 11).

The follower 179 riding cam 178 is connected directly to the main fuel metering valve 130, by rod 180, and the lift of the metering valve 130 off its seat is then equal to "w."

As shown in column 11, "w" can be expressed in terms of $P_1$ and a function ($\varphi$) of $N/\sqrt{T_1}$, that is:

$$w = a \cdot P_1 \varphi_2 (N/\sqrt{T_1})$$

(see Equation 14 in column 11) and from (26) in column 23.

$$(p_f - p_m) = (k_t A_{bt}/A_m) \cdot T_1$$

where $k_t A_{bt}/A_m = K$, in Equation 15. As shown in columns 11–12, by substituting these values in Equation 14, that equation reduces to Equation 17 which is the same as Equation 1 in column 4, and hence the control mechanism, as herein described, achieves the objective of metering, for automatic acceleration, corrected fuel flow as a predetermined, selected function of corrected engine speed.

This is the first and primary objective of the control herein described.

Having provided for automatic acceleration of the engine r.p.m. at any condition of altitude or inlet temperature, it is necessary now to provide a speed control, so that when the engine has accelerated to the r.p.m. corresponding to the position of the pilot's power lever, the acceleration is checked, and the engine continues to run in equilibrium at the desired speed.

To describe how this is done, reference should be made to the main speed governor, mechanism 181–196 shown in the left center part of FIGURE 2.

The main speed governor consists essentially of a pair of flyweights 183 that rotate at a speed proportional to engine speed, and which exert a rightward force on a push rod 184 and a spool valve 185. This rod 184 is loaded in a leftward direction by a spring 186, whose degree of compression can be varied by means of a manually operated cam 187, that is positioned from the pilot's control lever 44.

Suppose the cam 187 to be in some given position and the engine to be running at a very low speed. Then the leftward push of the speeder spring 186 may for the amount be supposed to overpower the rightward push from the flyweights 183, so that the port denoted by $A_g$ in the governor spool valve sleeve 198 is closed. Then the system as shown in FIGURE 2, is free to operate unimpeded by any action of the governor. Assuming the acceleration control hereinbefore described, to have been properly designed and matched to the particular engine, the fuel flow to the engine will be permissible maximum, as indicated by the stall limit line of FIGURE 3. This fuel supply being greater than that required for steady state running, the engine will accelerate.

As the engine speeds up, the rightward force exerted by the flyweights 183, increases, and eventually the engine speed becomes great enough to allow this flyweight force to overcome the force of the speeder spring 186, and the spool valve 185 will begin to move to the right. When the governor spool valve 185 has moved a certain amount, the port $A_g$ in sleeve 98 begins to open up. Since, during this moving of the spool valve, the rightward force of the flyweights 183, ($k_n N^2$), is equal to the leftward push of the spring 186, ($F_{so} + k_s h$), we can equate these two forces:

$$k_n N^2 = F_{so} + k_s h \quad (40)$$

and differentiating:

$$2 k_n N \cdot dN = k_s dh \quad (41)$$

or $$dh = (2 k_n / k_s) N \cdot dN \quad (42)$$

The area of the port $A_g$ can be made proportional to $dh$, so that:

$$A_g = a \cdot dh = (2 a k_n / k_s) N \cdot dN \quad (43)$$

The force of the deceleration spring 203, $F_{sd}$, is rather small, so that as soon as $A_g$ starts to open up, the $h_m$ pressure immediately escapes through $A_g$ and valve 201 to reservoir 51 ($h_o$), and the metering head control valve 98, which is urged to the closed position by a fairly strong bellows, 99, can be assumed to close immediately, since the pressure $h_m$ is no longer high enough to overcome said bellows push.

In this case then:

$$h_x = h_o + F_{sd}/A_d \quad (44)$$

And the pressure $h_m$ is determined by the flow through restriction 95 and $A_g$ in series, and:

$$h_m - h_x = \frac{(h_o - h_x)}{A_g^2[(1/B^2) + (1/A_g^2)]} \quad (45)$$

or $$(h_m - h_x) = \frac{(h_o - h_x)}{[(A_g/B)^2 + 1]} \quad (46)$$

The "set-up" metering head $(h_m - h_o)$ is $$(h_m - h_o) = (h_x - h_o) + \frac{(h_o - h_x)}{[(A_g/B)^2 + 1]} \quad (47)$$

or $$(h_m - h_o) = F_{sd}/A_d + \frac{[(h_c - h_o) - (F_{sd}/A_d)]}{[(A_g/B)^2 + 1]} \quad (48)$$

and by the action of the metering head detector and by-pass valve 127, this last is also the fuel metering head $(p_f - p_m)$, so that:

$$(p_f - p_m) = F_{sd}/A_d + \frac{[(h_c - h_o) - (F_{sd}/A_d)]}{[(A_g/B)^2 + 1]} \quad (49)$$

In Equation 43, we can interpret $dN$ as being a speed increment above the speed N at which the port $A_g$ first starts to crack open, and substituting the value of $A_g$ from Equation 43 for $A_g$ in Equation 49, we get:

$$(p_t - p_m) = (F_{sd}/A_d) + \frac{[(h_c - h_o) - (F_{sd}/A_d)]}{[(2ak_nN/k_s)^2 \cdot (dN)^2/B + 1]} \quad (50)$$

In Equation 50, $(h_c - h_o)$ is the constant control oil pressure delivered by the oil pump 82, and $a$, $k_n$, and B are constants of the design.

When (50) is plotted for any particular case, we get a curve of metering head vs. r.p.m. like that shown in FIGURE 5.

The speed, N, at which the port $A_g$ first starts to crack open is dependent on the force exerted by the speeder spring 186—that is, it is variable with the position of the pilot's control lever 44. Hence, as the control lever position 44 is varied a series of curves like that shown in FIGURE 5 is produced, one for each lever position. As shown in FIGURE 2, the small valve 201 is shown as loaded by a spring 203 whose compression is varied by a cam 206 that moves the rod 144, on the x-axis of the $N/\sqrt{T_1}$ computer. This cam 206 is the so-called "deceleration cam," and it is attached to the output piston 145 of the computer shown at the left bottom of FIGURE 2. It will be seen that this method of loading the valve 201 makes the quantity $F_s/A_d$ variable with $N/\sqrt{T_1}$, say:

$$F_{sd}/A_d = \varphi(N/\sqrt{T_1}) \quad (51)$$

Substituting this in Equation 50, we get:

$$(p_t - p_m) = \psi(N/\sqrt{T_1}) + \frac{[(h_c - h_o) - \psi(N/\sqrt{T_1})]}{[(ak_nN/k_s)^2 \cdot (dN)^2/B + ]} \quad (52)$$

Now by expressing (52) in terms of fuel flow to the engine, the fuel flow through the main fuel metering valve 130 is given by Equation 42:

$$W_f = C \cdot 2\pi Dw \cdot \sin \theta \cdot \sqrt{p_t - p_m}$$

and from (39) and (40), we get:

$$w = P_1 \cdot a \cdot \varphi_2(N/\sqrt{T_1}) \quad (53)$$

so that:

$$W_f = C \cdot 2\pi D \cdot P_1 \cdot a \cdot \varphi_2(N/\sqrt{T_1}) \cdot \sin \theta \cdot \sqrt{p_t - p_m} \quad (54)$$

or $$(p_t - p_m) = (W_f/P_1)^2 \left[\frac{1}{(\varphi_2(N/\sqrt{T_1}))}\right]^2 \cdot \left[\frac{1}{2\pi CD \cdot a \cdot \sin \theta}\right]^2 \quad (55)$$

and substituting this in Equation 52 we have:

$$W_f/P_1 = \varphi_2(N/\sqrt{T_1}) \cdot (2\pi CDa \sin \theta) \cdot$$

$$\sqrt{\psi(N/\sqrt{T_1}) + \left[\frac{(h_c - h_o) - \psi(N/\sqrt{T_1})}{(2ak_nN/k_s)^2 \cdot ((dN)^2/B) + 1}\right]} \quad (56)$$

Equation 56 gives the relation between fuel flow, r.p.m., compressor inlet temperature and pressure, and the design constants of the normal fuel control system during the time when the speed governor is controlling the operation of the engine.

It is to be noted that in Equation 56 the last term under the square root sign contains $(dN)^2$ in the denominator. When the quantity $(dN)$ becomes large—i.e., when the engine speed is very much above speed N at which the governor valve port begins to crack open—this last term under the square root sign becomes very small, and has a negligible effect, so that the fuel flow becomes:

$$W_f/P_1 = \varphi_2(N/\sqrt{T_1}) \cdot (2\pi CD \cdot a \sin \theta) \cdot \sqrt{\varphi(N/\sqrt{T_1})} \quad (57)$$

which is a function of corrected speed only. This gives the minimum fuel flow corrected for $P_1$ (or what is the same thing, for altitude) that the controller will produce when the governor is full cut-in.

The functional relation $(k)$ is dependent on the form of $\varphi$—i.e., on the contour of the cam 206. This cam is contoured so as to make the fuel flow in $(k)$ greater than the burner blowout limit of the engine, thus permitting the greatest possible rate of engine deceleration to be built into the control without losing combustion at any altitude.

The control thus far described allows for automatic acceleration, speed control, and automatic deceleration of the engine.

Figure 6:
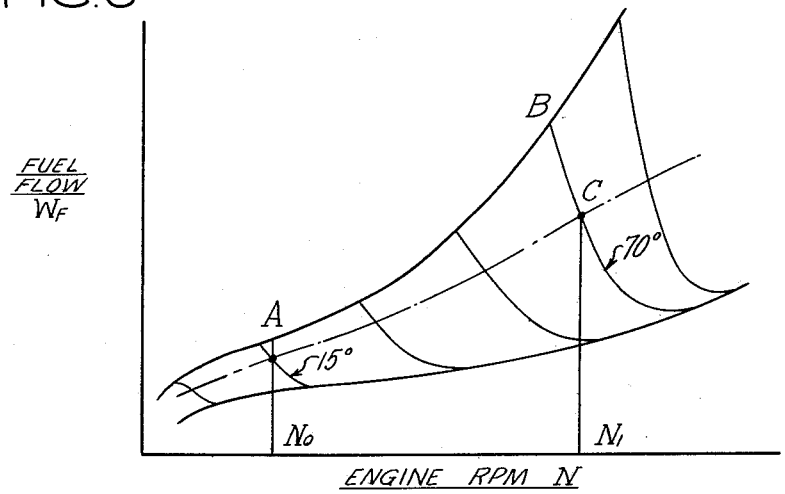

To sum up these features, the general characteristic curves produced by the control are shown in FIGURE 6, for one particular set of operating conditions—as, for instance, a standard day at sea level.

For example, if the engine is running at r.p.m.=$N_0$ (FIGURE 6) with the throttle at say 15°, and then the throttle 44 is advanced quickly to say 70°, the sequence of events is as follows.

The advance of the throttle 44 compresses the speeder spring 186, which overpowers the governor flyweights 183, and closes the governor valve port $A_g$ in sleeve 198. This transfer the operation to the acceleration control, and the engine fuel flow immediately increases to point "A" (FIGURE 6). The engine then accelerates, the fuel flow being automatically regulated to ride up the line AB, which defines the maximum permissible fuel flow the engine can take. At point "B," the governor flyweights 183 overpower the speeder spring 186, and the governor port $A_g$ opens up to reduce the fuel flow along the line BC (FIGURE 6), as expressed by Equation 64. At the point "C" (FIGURE 6), the fuel flow delivered by the control is just exactly equal to the engine requirement as shown by the dot-dash line AC, and the engine will continue to run at the speed, N, until a further change in throttle 44 position is made.

It will be seen that when the throttle 44 is retarded, the reverse condition prevails, and the fuel flow is reduced to the permissible deceleration value, permitting the engine to slow down as rapidly as possible without losing fire.

It was mentioned in the foregoing that turbine temperature ($T_4$) may in some cases be a limiting factor in the engine operation, and not compressor stall. Assuming an engine to be running either in steady state equilibrium, or in a transient condition (accelerating), if the fuel input to the engine is increased, the combustion of this additional fuel causes the temperature of the gases entering the turbine to increase, and at the same time the volumetric expansion of these gases requires a higher combustion chamber pressure to force them through the turbine inlet nozzles.

If the combustion chamber pressure should rise sufficiently high, stalling of the compressor will result, and the control system described in the above pages is devised to avoid this danger.

If the temperature should rise sufficiently, damage to the turbine will result, and this must also be avoided for safe operation of the engine.

The normal control system incorporates means for overriding the fuel control previously described, in case the temperature of the turbine gases, $T_4$, reaches a selected safe limit.

The operation of this temperature over-ride is in principle similar to that of the speed governor. The mechanism is shown schematically in the left top part of FIGURE 2.

At the top is shown a thermocouple 208, which would actually be a set of thermocouples connected in parallel, and mounted in the tail pipe section 15 of the engine (FIGURE 1) to sense the turbine exhaust gas temperature, $T_4$. The electromotive force developed by the thermocouple 208 is fed into an electric amplifier 211, the output signal from which is a current that is proportional to the thermocouple electromotive force.

In the output circuit of the amplifier, a solenoid 215 is provided, the armature of which is connected to a spool valve 216, as shown in FIGURE 2.

The solenoid valve assembly is restrained by a spring 217, so that as long as the current output of the amplifier 216 is below a certain value, the port 218 of the spool valve 216 is closed.

When the output current of the amplifier 211 reaches a certain selected value, corresponding to a certain thermocouple electromotive force, and turbine gas temperature, $T_4$, the magnetic pull of the solenoid 215 overcomes the force of the restraining spring 217, and the port 218 of the spool valve 216 begins to open up, giving an area $A_t$, at said port, which is proportional to the increment of temperature above that temperature at which $A_t$ begins to crack open.

The resemblance between this temperature control and the main speed control shown in FIGURE 2 is evident, the principal difference being that in the temperature control there is no back pressure valve 201 on the downstream side of the spool valve 216.

The algebraic expression for the relation between fuel flow and turbine temperature is an equation of the same form as Equation 64.

Figure 7:
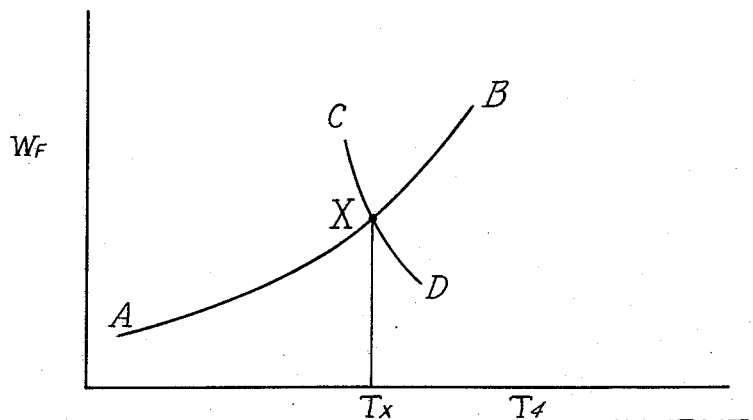

At some particular condition of engine speed, N, and ambient air conditions, the relation between engine fuel flow and the resulting tail pipe temperature, $T_4$, is as indicated by the curve AB in FIGURE 7.

The temperature limiting control just described will permit a fuel flow as shown by the line CD of FIGURE 7. It is seen that this is a simple proportional control, in which the engine fuel flow indicated by the line CD is reduced by an amount that is proportional to the excess temperature above some chosen value. Expressed symbolically:

$$dW_f = -k dT_4 \qquad (58)$$

where $k$ is the proportionality factor of the control.

It is well known that with this type of control the temperature will stabilize at the point X in FIGURE 7, given by the intersection of the two curves, AB and CD.

The operation of the change-over valve mechanism, and the emergency control system, has been sufficiently explained in the description of their construction and arrangement; in columns 6–7 for the change-over valve mechanism, and in columns 16–19 above for the emergency fuel control system; so that no further elaboration of the operation of these components is necessary here.

While I have shown and described the preferred embodiment of my invention, I desire it to be understood that I do not limit myself to the particular details of construction and arrangement of elements disclosed by way of illustration, as these may be changed and modified by those skilled in the art without departing from the spirit of my invention, or exceeding the scope of the appended claims.

I claim:

1. A fuel and speed control apparatus for a turbo-jet engine, comprising, in a single self-contained package: a fuel metering valve; a series of devices for respectively measuring engine inlet air absolute temperature and engine speed; means responsive under all operating conditions to the conjoint action of said devices and acting on said valve, for varying the flow area through said valve in accordance with a selected, composite function of said speed and temperature; and means for regulating the pressure differential across said valve as a linear function of said temperature.

2. In a fuel supply system for a turbo-jet engine, control apparatus having means for varying the fuel flow to the engine which comprises: a fuel metering orifice; means for varying the area of said orifice in accordance with the product of engine inlet air pressure times a preselected function of the ratio of engine speed to the square root of the engine inlet air temperature; means for varying the metering head across said orifice, during engine acceleration, in accordance with said temperature; and means for varying said metering head, during engine deceleration, in accordance with another preselected function of said ratio.

3. For a turbo-jet engine having an air compressor, control apparatus according to claim 2, comprising means for limiting the maximum rate of fuel flow to the engine during engine acceleration, in accordance with a selected maximum permissible compressor ratio that results from said rate of fuel flow, at any combination of engine speed, and engine inlet air temperature and pressure, thereby preventing compressor stall under such operating conditions.

4. A fuel and speed control apparatus for a turbo-jet engine containing, in a single, sealed casing, means for regulating the maximum fuel flow to the engine comprising: first means responsive only to the engine inlet air temperature; and second means, responsive to the product of engine inlet air absolute pressure times a preselected function of the ratio of engine speed to the square root of said temperature, and coacting with said first means; and means for generating said function so that the compensation of said fuel flow for variations in said temperature, speed and pressure is inherent in the operation of said first and second means, and no additional correction factors are required for such compensation.

5. In a system for controlling the flow of liquid fuel to the combustion chamber of a turbojet engine, means defining a flow passage for the fuel having a metering restriction therein, a regulating valve for controlling a metering head across said restriction to thereby control the speed of the engine; a speed governor driven by the engine and means actuated by said governor for positioning said valve solely in accordance with engine speed, to maintain a constant engine speed, only during steady state operation of said engine, including means, responsive solely to changes in temperature of the air flowing to said engine during acceleration of the engine, for controlling the action of said regulating valve, in accordance with said changes, during said acceleration.

6. In a system for controlling the flow of liquid fuel to the combustion chamber of a turbojet engine, means defining a flow passage for the fuel having a metering restriction therein, a regulating valve movable to control a metering head across said restriction, an engine-driven speed governor having operatively associated means for positioning said valve solely in accordance with engine speed, only to maintain a constant engine speed, during steady state operation of said engine, including pressure responsive means, connected to said regulating valve and means, responsive solely to engine inlet air temperature and effective only during acceleration of said engine, for automatically regulating a pressure differential across said pressure responsive means, in accordance with said temperature, during engine acceleration.

7. In a system for controlling the flow of liquid fuel to a turbojet engine, means defining a flow passage for the fuel having a metering restriction therein, a regulating valve for controlling a metering head across said restriction; a manually operable member operatively connected to said valve, an engine-driven speed governor also having means operatively connected with said valve and subject to said manual member, for positioning said valve solely in accordance with engine speed, during steady state operation of said engine, including pressure responsive means connected to said regulating valve, and means for subjecting said pressure responsive means to a pressure differential varying solely with the square root of engine with inlet air temperature during engine acceleration, to automatically maintain the rate of fuel feed within predetermined limits only during said acceleration.

8. In a system for controlling the flow of fuel to a turbojet engine, means defining a flow passage for the fuel having a metering restriction therein, a valve for varying a metering head across said restriction; a speed governor driven by the engine and operatively connected to said valve and having operatively associated means for automatically positioning said valve solely in accordance with engine speed, during steady state operation of the engine, manual means operable at the will of a pilot for varying the position of said valve; and means, responsive to changes in temperature of the air flowing to the engine, for automatically varying said metering head solely in accordance with said temperature, only during acceleration of the engine.

9. In a system for controlling the flow of liquid fuel to a turbojet engine, means defining a flow passage for the fuel having a metering restriction therein, a valve movable to selectively vary a metering head across said restriction; a speed governor having operatively associated means for positioning said valve solely in accordance with engine speed only during steady state operation of said engine; pressure responsive means operatively connected to said regulating valve; and means, effective only during acceleration of the engine, for automatically producing a pressure differential across said pressure responsive means, varying solely with variations in the absolute temperature of the air flowing to the compressor, during engine acceleration.

10. In a system for controlling the flow of liquid fuel to a turbojet engine, means defining a flow passage for the fuel having a metering restriction therein, a valve for varying a metering head across said restriction; a manually operable member operatively connected to said valve, an engine-driven speed governor, also having an operative connection with said valve and subject to said manual member, said governor having operatively associated means for positioning said valve solely in accordance with engine speed, during steady state operation of said engine; pressure responsive means operatively connected to said valve, and means, effective only during engine acceleration and deceleration, for subjecting said pressure responsive means to a pressure differential varying with variations in the temperature of the air flowing to the engine, to automatically maintain the rate of fuel feed within predetermined limits during engine acceleration and deceleration.

11. In a system for controlling the flow of fuel to a turbojet engine, means defining a flow passage for the fuel having a metering restriction therein, a valve for varying a metering head across said restriction; an engine-driven governor operatively connected to said valve and having operatively associated means for automatically positioning said valve solely in accordance with engine speed only during steady state operation of the engine; manual means operable at the will of a pilot for varying the adjustment of said valve; and means, responsive to changes in engine speed and temperature of the air flowing to the engine, for automatically varying said metering head only during deceleration of the engine.

12. In a system for controlling the flow of liquid fuel to a turbojet engine, means defining a flow passage for the fuel having a metering restriction therein, a valve for controlling a metering head across said restriction; speed responsive means driven by the engine for positioning said valve solely in accordance with engine speed, only during steady state operation of the engine; means, responsive to the square root of the absolute temperature of the air flowing to the engine, for automatically varying the position of said valve, during changes of engine speed, to regulate said fuel flow in accordance with the square root of said temperature, during said changes.

13. In a system for feeding fuel to an engine, a conduit supplying fuel to said engine, a metering restriction in the conduit, means for regulating the pressure drop across the restriction in accordance with engine inlet air temperature, and means for automatically varying the effective area of the restriction in accordance with changes in engine speed, and engine inlet air temperature and pressure.

14. In a system for supplying liquid fuel to a turbojet engine having one or more fuel discharge nozzles, a pump for supplying fuel under pressure to said nozzles, a fuel conduit communicating said pump with said nozzles and having a metering restriction therein upstream of the nozzles; adjustable valve means for varying the flow area through said restriction, manual means for adjusting said valve means, an engine-driven governor operatively connected to said valve means for automatically positioning the latter; and means responsive to changes in the temperature of the air flowing to the engine and arranged to adjust the flow area through said restriction, independently of said governor, during acceleration and deceleration of said engine.

15. In a turbojet engine fuel control having a fuel passage, a metering restriction therein; first means movable to control the effective area of said restriction; second means for regulating the pressure head across said restriction; means actuating said second means to vary said pressure head in accordance with varying values of engine inlet air temperature, so as to maintain for each setting of said first means a desired ratio of fuel flow to said temperature; and means, including manually operable means and engine speed responsive means, for variably positioning said first means within a predetermined range of motion, to vary the fuel to air ratio within predetermined rich and lean limits.

16. Regulating apparatus for a turbojet engine including a fuel feeding system, a fuel feed valve therein, an engine-driven speed responsive device for positioning said valve to maintain a constant engine speed during steady state operation of the engine, means, responsive to changes in engine speed, and engine inlet air temperature and pressure, for adjusting the position of said valve; and means, responsive to variations in engine inlet air temperature for regulating the pressure head across said valve, only during engine acceleration and deceleration.

17. A device for regulating the fuel feed of a turbojet engine, comprising a fuel conduit having a feed restriction therein, a feed valve controlling the flow area through said restriction; means for positioning said feed valve, including a manual control member and an engine-driven speed governor, means for regulating the differential pressure across said feed valve in accordance with engine inlet air temperature; and means for adjusting the position of said feed valve, in relation to changes in engine speed, and engine inlet air temperature and pressure; whereby said fuel feed is regulated in accordance with said speed, temperature and pressure.

18. In a fuel control device for controlling the flow of fuel to the combustion chamber of a turbojet engine, a fuel supply conduit, a feed valve in said conduit movable to regulate said fuel flow, a speed governor driven by said engine for positioning said valve in accordance with engine speed, during steady state engine operation; a by-pass valve arranged to vary the fuel metering head across said valve, in accordance with engine inlet air temperature; and means, responsive to changes in the temperature and pressure of the air flowing to said combustion chamber, for adjusting the position of said feed valve.

19. In a system for feeding fuel to a turbojet engine, a conduit supplying fuel to said engine, a metering restriction in the conduit, means for regulating the pressure drop across the restriction in accordance with engine inlet air temperature; means for automatically varying the effective area of the restriction in accordance with changes in engine speed and engine inlet air temperature and pressure under all engine operating conditions; and means for automatically limiting said pressure drop in accordance with a temperature level in said engine, whereby said temperature is limited to a selected maximum safe value.

20. In a turbojet engine fuel supply system having a single source of fuel under pressure, a control apparatus comprising, in a single, sealed casing: a normal fuel control system, an emergency fuel control system, and a single, manually-controlled, hydraulically-operated, valve for bringing the latter system into operation in the event of failure of the former; said normal system comprising a series of interconnected, coacting, hydraulic devices, respectively responsive to engine inlet air pressure, to engine inlet air temperature, to engine speed, and all connected to a single manual control element, for regulating the fuel flow from said source to said engine, in accordance with values of said pressure, temperature and speed, and the position of said control element; said emergency system comprising valve means, operated by said manual control element, for controlling the fuel flow from said source to said engine; said normal and emergency systems having in common the same means for regulating the fuel flow in each system for variations in flight altitude, and the same common speed responsive means for regulating the fuel flow in each system, so that the engine speed cannot exceed a preselected, maximum value.

21. In a fuel supply system, for a turbojet engine having an air compressor, a fuel and speed control apparatus comprising: a plurality of devices, each respectively responsive to compressor inlet pressure, and temperature, and engine speed; and means actuated by the conjoint action of said devices; for regulating the maximum fuel flow to the engine in accordance with the equation:

$$W_f = P_1 \cdot \sqrt{T_1} \cdot f(N/\sqrt{T_1})$$

where, $W_f$ is the rate of fuel flow to the engine, $P_1$ and $T_1$ are compressor inlet air pressure and temperature, respectively, $N$ is engine speed, and $f$ is a preselected function of the ratio, $N/\sqrt{T_1}$, so chosen as to limit said maximum fuel flow to a value less than that which would cause compressor stall; said control apparatus having, in operative association with said devices and means, a manual control element and means which produce a substantially constant engine speed, corresponding to any selected position of said element, under steady state engine operating conditions.

22. A control apparatus according to claim 21, having means, operatively associated with said devices and first mentioned means, which regulate the rate of increase of fuel flow to the engine, during acceleration of the engine, so that the maximum rate of said fuel flow is always less than that corresponding to the stall limit of said compressor, whereby the engine can be accelerated at the greatest possible rate consistent with precluding compressor stall.

23. A control apparatus according to claim 21, having means which regulate the rate of reduction of fuel flow to the engine, during deceleration of the engine, so that the minimum rate of said flow is always greater than that corresponding to the burner blowout limit of the engine, whereby the engine can be decelerated at the greatest possible rate consistent with the continuous maintenance of fuel combustion.

24. A control apparatus according to claim 21, having a metering valve for metering said fuel flow, and means, responsive to the pressure differential across said valve, for maintaining said differential at a selected working value at all times, despite variations in pressure of the fuel entering said apparatus.

25. A control apparatus according to claim 21, having means for measuring the quantity, $N/\sqrt{T_1}$, and means for regulating the fuel flow to the engine so that a preselected maximum value of the quantity, $$W_f/(P_1\sqrt{T_1})$$

is obtained for every value of the quantity, $N/\sqrt{T_1}$, whereby the function, $f$, is directly generated and said fuel flow is inherently compensated for variations in value of $P_1$ and $T_1$.

26. A control apparatus according to claim 25, having: a selected contoured fuel metering valve; a device which automatically computes the value of the ratio, $N/\sqrt{T_1}$, and has an output movement that is a selected particular function $f$ of said ratio; a device which measures the value of $P_1$ and multiplies said movement by said value of $P_1$; and means for positioning said valve in accordance with said multiplied movement, whereby the flow area through said valve is said particular function of said multiplied movement $(N/\sqrt{T_1}) \cdot P_1$.

27. A control apparatus according to claim 26, having a valve for by-passing fuel around said metering valve, for regulating the fuel pressure differential across said metering valve; a device, responsive to $T_1$, for creating a second pressure differential as a linear function of $T_1$; and means for varying the opening of said by-pass valve in accordance with said second pressure differential, so that said fuel pressure differential is a linear function of $T_1$; whereby the fuel flow to the engine is regulated in accordance with said equation.

28. In a fuel supply system for a turbojet engine having an air compressor, a control apparatus comprising: a normal fuel control system; an emergency fuel control system; a valve for alternatively connecting said systems to a source of fuel under pressure, and means operatively associated with said valve for bringing said emergency system into operation in the event of failure of said normal system; said normal system comprising means for regulating the maximum fuel flow to the engine in accordance with the equation:

$$W_f = P_1 \cdot \sqrt{T_1} \cdot f(N/\sqrt{T_1})$$

where, $W_f$ is the rate of fuel flow to the engine, $P_1$ and $T_1$ are compressor inlet air pressure and temperature, respectively, $N$ is engine speed, and $f$ is a selected function of the ratio, $N/\sqrt{T_1}$; said control apparatus having means, operatively associated with both said normal and emergency systems, for modifying the fuel flow to the engine, in accordance with variations in ambient atmospheric pressure, so as to provide an increasing schedule of idle engine speed with increasing flight altitude, and thus prevent engine cut-out at high flight altitudes.

29. A control apparatus according to claim 28, wherein said emergency system comprises a fuel metering valve whose opening is varied by a movable, manual control lever, and valve means for automatically regulating the pressure differential across said metering valve, so that the engine speed varies in accordance with the position of said lever.

30. A control apparatus according to claim 29, having means, operatively associated with said manual control lever and said means for regulating the maximum fuel flow to the engine, whereby the operation of the normal system is responsive to the position of said control lever.

References Cited in the file of this patent

UNITED STATES PATENTS

| | | |
|---|---|---|
| 2,055,280 | Dodson | Sept. 22, 1936 |
| 2,538,582 | Mordell | Jan. 16, 1951 |
| 2,557,526 | Bobier et al. | June 19, 1951 |
| 2,573,724 | Neal | Nov. 6, 1951 |
| 2,581,275 | Mock | Jan. 1, 1952 |
| 2,596,815 | Keil | May 13, 1952 |
| 2,601,777 | Woodward | July 1, 1952 |
| 2,616,254 | Mock | Nov. 4, 1952 |
| 2,622,393 | Edwards et al. | Dec. 23, 1952 |
| 2,629,984 | Jamison et al. | Mar. 3, 1953 |
| 2,673,556 | Reggio | Mar. 30, 1954 |
| 2,683,965 | Nagely | July 20, 1954 |
| 2,695,055 | Cruckshank | Nov. 23, 1954 |
| 2,705,047 | Williams et al. | Mar. 29, 1955 |

(Other references on following page)

UNITED STATES PATENTS

| | | |
|---|---|---|
| 2,720,751 | Kunz | Oct. 18, 1955 |
| 2,750,734 | Anxionnaz et al. | June 19, 1956 |
| 2,760,565 | Schmid | Aug. 28, 1956 |
| 2,761,280 | Atkinson | Sept. 4, 1956 |
| 2,762,194 | Kunz et al. | Sept. 11, 1956 |
| 2,763,985 | Speer | Sept. 25, 1956 |
| 2,763,986 | Black | Sept. 25, 1956 |
| 2,786,331 | Williams | Mar. 26, 1957 |

FOREIGN PATENTS

| | | |
|---|---|---|
| 448,659 | France | Dec. 3, 1912 |
| 580,149 | Great Britain | Aug. 8, 1946 |

OTHER REFERENCES

"Aircraft Jet Powerplants," by F. P. Dunham; Prentice-Hall, New York, 1951, pages 76–78.

"Gas Turbine Fuel Systems," by W. A. Andrews; Flight, Oct. 20, 1949, pages 512–514.